(12) United States Patent
Kajita et al.

(10) Patent No.: US 6,839,736 B1
(45) Date of Patent: Jan. 4, 2005

(54) MULTI-MEDIA E-MAIL SYSTEM AND DEVICE FOR TRANSMITTING A COMPOSED RETURN E-MAIL

(75) Inventors: Satoshi Kajita, Yukuhashino (JP); Satoshi Ando, Munakata (JP); Hiroyuki Yoshida, Kasuya (JP); Yuichi Kawaguchi, Kasuya (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 09/447,297

(22) Filed: Nov. 23, 1999

(30) Foreign Application Priority Data

Nov. 24, 1998 (JP) ............................................ 10-333129

(51) Int. Cl.[7] .............................................. G06F 13/00
(52) U.S. Cl. ...................... 709/206; 709/238; 717/108; 707/10
(58) Field of Search ................................ 709/206, 238; 707/10; 717/108

(56) References Cited

U.S. PATENT DOCUMENTS

| | | | | |
|---|---|---|---|---|
| 4,713,780 A | * | 12/1987 | Schultz et al. ............... | 709/206 |
| 4,994,985 A | * | 2/1991 | Cree et al. ................... | 364/514 |
| 5,623,538 A | | 4/1997 | Petty | |
| 5,754,778 A | * | 5/1998 | Shoujima .................... | 709/206 |
| 5,761,525 A | | 6/1998 | Williams | |
| 5,781,186 A | * | 7/1998 | Jennings ..................... | 345/302 |
| 5,790,793 A | * | 8/1998 | Higley ................... | 395/200.48 |
| 5,826,062 A | * | 10/1998 | Fake et al. ................... | 715/513 |
| 5,841,966 A | | 11/1998 | Irribarren | |
| 5,948,058 A | * | 9/1999 | Kudoh et al. ................ | 709/206 |
| 5,995,093 A | * | 11/1999 | Lambourne et al. ........ | 345/327 |
| 6,073,166 A | * | 6/2000 | Forsen ........................ | 709/206 |
| 6,327,612 B1 | * | 12/2001 | Watanabe .................... | 709/206 |
| 2001/0042098 A1 | * | 11/2001 | Gupta et al. ................ | 709/206 |

FOREIGN PATENT DOCUMENTS

| | | |
|---|---|---|
| JP | 6-77992 | 3/1994 |
| JP | 8-125687 | 5/1996 |

OTHER PUBLICATIONS

Edwards, W. Keith. "The Design and Implementation of the MONTAGE Multimedia Mail System." Georgia Institute of Technology Software Engineering Research Center. IEEE, 1991.*

* cited by examiner

Primary Examiner—David Wiley
Assistant Examiner—Alina Boutah
(74) Attorney, Agent, or Firm—Wenderoth, Lind & Ponack, L.L.P.

(57) ABSTRACT

An object of the present invention is to reduce information volume going through a network when a multi-media E-mail is transmitted/received therethrough, which includes various types of media information being temporally and/or spatially related to one another. To attain the object, a return mail is composed by utilizing any object (received object) included in an incoming mail. Thereafter, the return mail is structured in a format for a multi-media E-mail including every object included in the return mail exclusive of the already-utilized object(s) and control information indicating how the objects in the return mail are temporally and/or spatially positioned, and then is transmitted to a computer system from which the incoming mail was transmitted.

12 Claims, 22 Drawing Sheets

F I G. 1
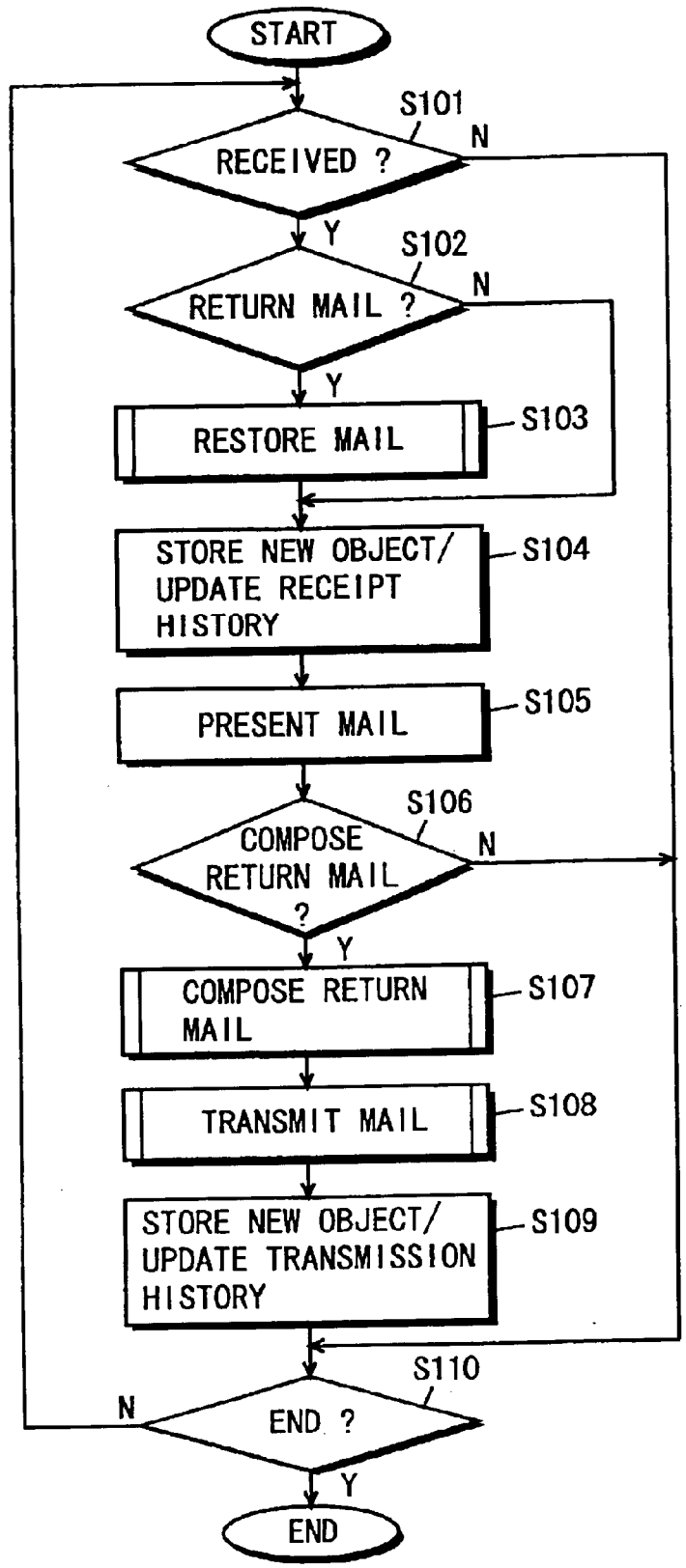

MULTI-MEDIA E-MAIL SYSTEM AND DEVICE FOR TRANSMITTING A COMPOSED RETURN E-MAIL

BACKGROUND OF THE INVENTION

1. Field of the Invention

The present invention relates to E-mail systems and devices, more particularly to a multi-media E-mail system and device for transmitting/receiving, through a network, multi-media E-mails each including various types of media information such as text, images, audio information.

2. Description of the Background Art

In conventional multi-media E-mail systems, images (image information) or audio information associated with text (text information) has been transmitted, for example, in an attachment file coming with a text file. In this system, when a receiver opens a multi-media E-mail, he/she will find two icons respectively indicate a text file and attachment file on a screen. With a click on these icons, the attachment file is opened with images on the screen or audio from a speaker.

In such conventional E-mail systems that transmit images or audio information in the attachment file, however, audio associated with text does not synchronize with the text, or images are not switched in synchronization with audio. This is because, timing is up to the receiver when to open the attachment file, and thus the attachment file is not always opened at the timing intended by a sender.

Therefore, another multi-media E-mail system is proposed, which is of a type treating media information (text, images, audio information, for example) each included in a multi-media E-mail as an object, and transmitting control information indicating when and where to present each object together with the objects. In such conventional systems (hereinafter, other conventional system), the sender side transmits control information indicating when and where to present each object together with a plurality of objects, and the receiver side presents each object in accordance with the control information.

FIG. 25 is a block diagram showing the functional structure of a transmitting terminal provided in the other conventional system. FIG. 26 is a block diagram showing the functional structure of a receiving terminal provided in the same system. Note that constituents appear under the same reference numerals are considered identical for every drawing.

A system shown in FIGS. 25 and 26 is disclosed in Japanese Patent Laying-Open No. 6-77992, for example.

In FIG. 25, the transmitting terminal provided for the conventional multi-media E-mail system includes a text inputting part 2501, an audio inputting part 2502, an images inputting part 2503, an inputted information controlling part 2504, an inputted information storing part 2505, an inputted information editing part 2506, an inputted information presenting part 2507, and a transmission controlling part 2508.

The text inputting part 2501 receives text (text information); the audio inputting part 2502 receives audio information; the images inputting part 2503 receives image information; the inputted information controlling part 2504 controls each of inputted media information (hereinafter, inputted information) as an object; and the inputted information storing part 2505 stores the inputted information. To be specific, the inputted text, audio and image information is each provided with an object identifier by the inputted information controlling part 2504, and then is written into the inputted information storing part 2505.

The inputted information editing part 2506 edits a temporal and/or spatial attribute(s) of the inputted information. The inputted information presenting part 2507 presents editing results of the inputted information editing part 2506. To be specific, a user refers to the inputted information presenting part 2507 to confirm the editing results of the inputted information editing part 2506.

The transmission controlling part 2508 adds control information indicating the editing results of the inputted information editing part 2506 to the inputted information each stored in the inputted information storing part 2505, and then structures the inputted information in a format for a multi-media E-mail. Thereafter, the transmission controlling part 2508 sends out the multi-media E-mail to a network (not shown).

In FIG. 26, the receiving terminal provided in the conventional multi-media E-mail system includes a receipt controlling part 2601, an inputted information storing part 2602, and an inputted information presenting part 2603. The receipt controlling part 2601 receives the multi-media E-mail from the network, takes out the inputted information (objects), and then writes the inputted information into the inputted information storing part 2602. Thereafter, according to the control information each added to the inputted information, the receipt controlling part 2601 temporally and/or spatially positions each of the inputted information so as to restore the mail intended by the sender. Thereafter, the receipt controlling part 2601 presents the restored mail to the receiver via the inputted information presenting part 2603.

Note that, the transmitting terminal and receiving terminal in FIGS. 25 and 26 may be separately structured, but are usually in a unit. That is, an integral-type transmitting/receiving terminal is popular for the other conventional system.

Hereinafter, it is described how the conventional multi-media E-mail system shown in FIGS. 25 and 26 are operated by referring to FIGS. 27 to 29.

FIG. 27 is a diagram showing the visualized structure of a mail-composing window used in the inputted information editing part 2506 in FIG. 25.

FIG. 28 is a diagram showing an exemplary multi-media E-mail displayed in the mail-composing window in FIG. 27, which is composed by the inputted information editing part 2506 in FIG. 25.

FIG. 29 is a diagram showing the internal data structure of the multi-media E-mail composed by the inputted information editing part 2506 in FIG. 25.

Note that reference characters "# number" appear in the drawings are the object identifiers for identifying the inputted information (objects).

First of all, the sender taps out text on a keyboard (not shown) of a transmitting/receiving terminal which is an integral type of the transmitting terminal in FIG. 25 and the receiving terminal in FIG. 26. In response thereto, the text inputting part 2501 receives the text. The inputted information editing part 2506 provides the inputted text with an object identifier #1, and then stores the same in the inputted information storing part 2505. Thereafter, the inputted text is identified as an object #1.

Second, the sender operates a scanner or TV camera (not shown), for example, to capture images, and then the images inputting part 2503 receives the images responding thereto. The inputted information editing part 2506 provides the inputted image information on human body and landscape with identifiers #2 and #3, respectively, and then stores the same in the inputted information storing part 2505. Thereafter, the inputted image of human body is identified as an object #2, and image of landscape as an object #3.

Next, the sender records audio by using a microphone (not shown), for example, and then the audio inputting part 2502 receives the audio responding thereto. The inputted information editing part 2506 provides the inputted audio information with an identifier #4, and then stores the same in the inputted information storing part 2505. Thereafter, the inputted audio information is identified as an object #4.

Then, the sender taps on the not-shown keyboard, for example, so as to specify temporal and/or 2D spatial relationship among the objects by referring to the mail-composing window in FIG. 27 displayed on a not-shown display.

In this manner, the mail is composed. The composed mail is displayed on the display via the inputted information presenting part 2507 (see FIG. 29). In FIG. 28, each of the objects is provided with the identifier, and also is perceivably indicated when and where to be presented and until when.

The composed mail has such internal data structure as shown in FIG. 29. Specifically, elements in the data structure are: a media identifier field storing media identifiers (# number) uniquely identifying media information; a media information field storing substance (actual information) of the media information (note that, this media information field stores an address where the actual information is); a positional information field storing a position (coordinates) where the media information is presented; a presentation starting time field storing starting time for the media information to be presented; a presentation ending time field storing ending time for the media information being presented; and presentation time filed storing presentation time of the media information.

Thereafter, in the transmission controlling part 2508, the composed mail is structured in a format for an outgoing mail. The mail is then sent out to the network through a not-shown network interface, goes through the network, and then reaches the transmitting/receiving terminal on the receiver side.

In the transmitting/receiving terminal on the receiver side, the receipt controlling part 2601 receives the outgoing mail through the network, takes out the inputted information (objects), and then stores the same in the inputted information storing part 2602. Thereafter, according to the control information each added to the inputted information, the receipt controlling part 2601 temporally and/or spatially repositions these objects so as to restore the mail as shown in FIG. 28. The restored mail is presented to the receiver via the inputted information presenting part 2603.

As is known from the above, in the other conventional multi-media E-mail system provided with the transmitting and receiving terminals shown in FIGS. 25 and 26, the media information included in the multi-media E-mail is each treated as an object, and is transmitted together with the control information indicating when and where to present each object. Therefore, the media information in the multi-media E-mail can be each temporally and/or spatially related to one another. To be specific, in the mail, audio can synchronize with text on the screen, or images can be switched in synchronization with audio. Thanks to such improvement, E-mail will be widely prevalent within the foreseeable future.

It is predictable, however, the information volume to be transmitted will see a leap as the multi-media E-mail system becomes prevalent, and resultantly networks will be deficient in capacity. At the same time, as the audio or image is much larger in volume than the text, time and cost required for the communications will be an issue for users. Nevertheless, the other conventional system has not been working out and applying any solution to decrease the to-be-increased information volume.

SUMMARY OF THE INVENTION

Therefore, an object of the present invention is to provide a multi-media E-mail system and device that transmits/receives, through a network, multi-media E-mails each having various types of media information being temporally and/or spatially related to one another, and further, reduces information volume going through the network.

The present invention has the following features to solve the problem above.

A first aspect of the present invention is directed to a multi-media E-mail system for transmitting/receiving a multimedia E-mail including various types of media information and positioning control information indicating how the media information is each temporally and/or spatially positioned. The multi-media E-mail system of the first aspect of the present invention comprises: receiving the multi-media E-mail; restoring an incoming mail composed by a sender of the received multi-media E-mail by positioning the media information each included in the received multi-media E-mail according to the positioning control information included therein; storing the media information included in the received multi-media E-mail as received media information; composing a return mail for the restored incoming mail by utilizing the received media information; and transmitting the composed return mail back to the sender in a form of a multi-media E-mail including every media information included in the return mail exclusive of the received media information and the positioning control information indicating how the every media information in the return mail is each temporally and/or spatially positioned.

As described above, in the first aspect, when a multi-media E-mail including various types of media information and positioning control information indicating how the media information is each temporally and/or spatially positioned is received, an incoming mail is restored by positioning the media information according to the positioning control information, and the media information is stored as received media information. Thereafter, a return mail for the incoming mail is composed by utilizing the stored received media information, and then the composed return mail is transmitted back to a sender of the incoming mail in a form of a multi-media E-mail including every media information in the return mail exclusive of the received media information and the positioning control information indicating how the every media information in the return mail is each temporally and/or spatially positioned.

To be more specific, as the sender of the incoming mail possesses the incoming mail (that is, information identical to the received media information is stored as transmitted media information on the sender side), there is no need to send the received media information back to the sender if the return mail is composed by utilizing the media information included in the incoming mail (that is, if the return mail includes the received media information). Therefore, the multi-media E-mail to be transmitted to the sender does not include the received media information.

In this manner, when such multi-media E-mail that various types of media information included therein is each temporally and/or spatially related to one another is transmitted/received through a network, received media information does not go through the network twice. Therefore, information volume going therethrough can be reduced.

According to a second aspect, further to the first aspect, when composing the return mail, the received media information is divided, and the return mail is composed by using divided media information obtained by the division, and when transmitting the return mail, as an alternative to the divided media information, division controlling information indicating at where the received media information is divided is transmitted in addition to the multi-media E-mail.

As described above, in the second aspect, when a return mail is composed by utilizing received media information, any one of the received media information is divided into various divided media information. In this manner, one or more divided media information can be deleted, interchanged with another, or new media information can be inserted between any two successive divided media information (dividing position).

Further, when the received media information is divided, the multi-media E-mail to be transmitted to the sender further includes division controlling information indicating at where the received media information is divided (for example, when the received media information is moving images, it is represented by frame number, and text data by line number) as an alternative to the divided media information. Accordingly, as the divided media information is not sent back to the sender, information volume going through a network can be reduced.

According to a third aspect, further to the first aspect, the multi-media E-mail system further comprises storing the media information included in the multi-media E-mail to be transmitted as transmitted media information, wherein when restoring the incoming mail, by positioning the media information each included in the received multi-media E-mail and the transmitted media information according to the positioning control information included in the multi-media E-mail, the incoming mail is restored.

As described above, in the third aspect, media information included in a mail (outgoing mail) to be transmitted is stored as transmitted media information. If a return mail for the outgoing mail is received, media information included in the received multi-media E-mail and previously-stored transmitted media information is positioned according to positioning control information included in the multi-media E-mail. In this manner, the incoming mail (return mail) can be restored.

According to a fourth aspect, further to the third aspect, when composing the return mail, the received media information is divided, and the return mail is composed by using divided media information obtained by the division, when transmitting the return mail, as an alternative to the divided media information, division controlling information indicating at where the received media information is divided is transmitted in addition to the multi-media E-mail, and when restoring the incoming mail, the transmitted media information is divided according to the division controlling information included in the received multi-media E-mail, and the incoming mail is restored by using the divided 15 media information obtained by the division.

As described above, in the fourth aspect, when a return mail is composed by utilizing received media information, any one of the received media information is divided into various divided media information. In this manner, one or more divided media information can be deleted, interchanged with another, or new media information can be inserted between any two successive divided media information (dividing position).

Further, when the received media information is divided, a multi-media E-mail to be transmitted back to the sender further includes the divided media information indicating at where the received media information is divided (for example, when the received media information is moving images, it is represented by frame number, and text data by line number) as an alternative to the divided media information. Accordingly, as the divided media information is not sent back to the sender, information volume going through a network can be reduced.

Still further, when a return mail is received, divided media information is first generated from the transmitted media information according to the division controlling information, and then the media information included in the received multi-media E-mail and the generated divided media information is positioned according to the positioning control information included in the multi-media E-mail. In this manner, the incoming mail (return mail) can be restored.

A fifth aspect of the present invention is directed to a multi-media E-mail device for transmitting/receiving a multimedia E-mail including various types of media information and positioning control information indicating how the media information is each temporally and/or spatially positioned. The multi-media E-mail device of the fifth aspect of the present invention comprises: a receipt controlling part in which the multi-media E-mail is received, and then an incoming mail composed by a sender of the received multi-media E-mail is restored by positioning every media information included in the received multi-media E-mail according to the positioning control information included therein; a first inputted information storing part storing the media information included in the multi-media E-mail received by the receipt controlling part as received media information; an inputted information editing part composing a return mail for the incoming mail restored by the receipt controlling part by utilizing the received media information; and a transmission controlling part transmitting the return mail composed by the inputted information editing part back to the sender in a form of a multi-media E-mail including every type of the media information included in the return mail exclusive of the received media information and the positioning control information indicating how the every media information in the return mail is each temporally and/or spatially positioned.

According to a sixth aspect, further to the fifth aspect, when a return mail is composed, the inputted information editing part divides the received media information, and composes the return mail by using divided media information obtained by the division, and the transmission controlling part transmits, as an alternative to the divided media information, division controlling information indicating at where the received media information is divided in addition to the multi-media E-mail.

According to a seventh aspect, further to the fifth aspect, the multi-media E-mail device further comprises a second inputted information storing part storing media information included in a multi-media E-mail to be transmitted by the transmission controlling part as transmitted media information, wherein the receipt controlling part restores an incoming mail by positioning each type of the media information included in the received multi-media E-mail and the transmitted media information according to the positioning control information included in the multi-media E-mail.

According to an eighth aspect, further to the seventh aspect, when a return mail is composed, the inputted information editing part divides the received media information, composes the return mail by using divided media information obtained by the division, and the transmission controlling part transmits, as an alternative to the divided media information, division controlling information indicating at where the received media information is divided in addition to the multi-media E-mail, and when a return mail is restored, the receipt controlling part divides the transmitted media information according to the division controlling information included in the received multi-media E-mail, and restores the incoming mail by using the divided media information obtained by the division.

A ninth aspect of the present invention is directed to a recording medium on which a program, to be run in a computer device, for transmitting/receiving a multi-media E-mail including various types of media information and positioning control information indicating how the media information is each temporally and/or spatially positioned is recorded. The program for realizing an operational environment on the computer device of the ninth aspect oft the present invention includes instructions operable to instruct the computer device to: receive the multi-media E-mail; restore an incoming mail composed by a sender of the multi-media E-mail by positioning every media information included in the received multi-media E-mail according to the positioning control information included therein; store the media information included in the received multi-media E-mail as received media information; compose a return mail for the restored incoming mail by utilizing the received media information; and transmit the composed return mail back to the sender in a form of a multi-media E-mail including every media information included in the return mail exclusive of the received media information and the positioning control information indicating how the every media information in the return mail is each temporally and/or spatially positioned.

According to a tenth aspect, further to the ninth aspect, when composing the return mail, the program includes instructions operable to instruct the computer device to divide the received media information, and to compose the return mail by using divided media information obtained by the division, and when transmitting the return mail, the program includes instructions operable to instruct the computer device as an alternative to the divided media information, to transmit controlling information indicating at where the received media information is divided in addition to the multi-media E-mail.

According to an eleventh aspect, further to the ninth aspect, the program for realizing the operational environment on the computer device further includes instructions operable to instruct the computer device to store the media information included in the multi-media E-mail to be transmitted as transmitted media information, wherein when restoring the incoming mail, by positioning every media information included in the received multi-media E-mail and the transmitted media information according to the positioning control information included in the multi-media E-mail, the incoming mail is restored.

According to a twelfth aspect, further to the eleventh aspect, when composing the return mail, the program includes instructions operable to instruct the computer device to divide the received media information, and to compose the return mail by using divided media information obtained by the division, when transmitting the return mail, the program includes instructions to instruct the computer device, as an alternative to the divided media information, to transmit division controlling information indicating at where the received media information is divided in addition to the multi-media E-mail, and when restoring the incoming mail, the program includes instructions operable to instruct the computer device to divide the transmitted media information according to the division controlling information included in the received multi-media E-mail, and to restore the incoming mail by using the divided media information obtained by the division.

A thirteenth aspect of the present invention is directed to a method of supplying a program, to be run in a computer device, for transmitting/receiving a multi-media E-mail including various types of media information and positioning control information indicating how the media information is each temporally and/or spatially positioned to the computer device through a network. The method of the thirteenth aspect of the present invention comprises: receiving the multi-media E-mail; restoring an incoming mail composed by a sender of the received multi-media E-mail by positioning each of the media information included in the received multi-media E-mail according to the positioning control information included in the multi-media E-mail; storing the media information included in the received multi-media E-mail as received media information; composing a return mail for the restored incoming mail by utilizing the received media information; and transmitting the composed return mail back to the sender in a form of a multi-media E-mail including every media information included in the return mail exclusive of the received media information and the positioning control information indicating how the every media information in the return mail is temporally and/or spatially positioned.

According to a fourteenth aspect, further to the thirteenth aspect, when composing the return mail, the received media information is divided, and the return mail is composed by using divided media information obtained by the division, and when transmitting the return mail, as an alternative to the divided media information, division controlling information indicating at where the received media information is divided is transmitted in addition to the multi-media E-mail.

According to a fifteenth aspect, further to the thirteenth aspect, the method of supplying a program further comprises storing the media information included in the multi-media E-mail to be transmitted as transmitted media information, wherein when restoring the incoming mail, by positioning every media information included in the received multi-media E-mail and the transmitted media information according to the positioning control information included in the multi-media E-mail, the incoming mail is restored.

According to a sixteenth aspect, further to the fifteenth aspect, when composing the return mail, the received media information is divided, and the return mail is composed by using divided media information obtained by the division, when transmitting the return mail, as an alternative to the divided media information, division controlling information indicating at where the received media information is divided is transmitted in addition to the multi-media E-mail, and when restoring the incoming mail, the transmitted media information is divided according to the division controlling information included in the received multi-media E-mail, and the incoming mail is restored by using the divided media information obtained by the division.

These and other objects, features, aspects and advantages of the present invention will become more apparent from the following detailed description of the present invention when taken in conjunction with the accompanying drawings.

BRIEF DESCRIPTION OF THE DRAWINGS

FIG. 1 is a flowchart illustrating a multi-media E-mail system according to a first embodiment of the present invention;

DESCRIPTION OF THE PREFERRED EMBODIMENTS

The preferred embodiments of the present invention are described below with reference to the accompanying figures.
(First Embodiment)

FIG. 1 is a flowchart illustrating a multi-media E-mail system according to a first embodiment of the present invention.

Figure 2:
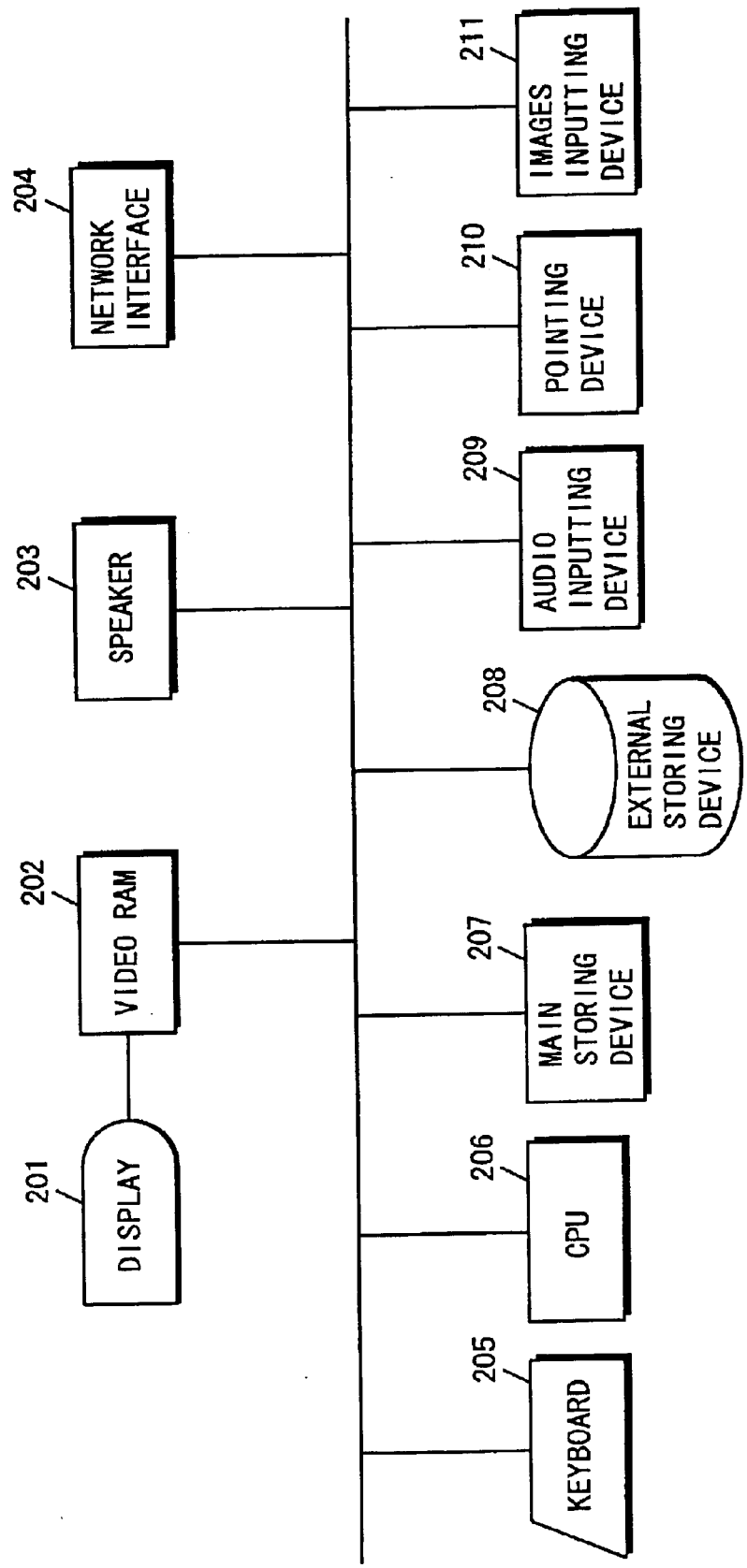
FIG. 2 is a block diagram showing the configuration of components in a computer system realizing the multi-media E-mail system shown in FIG. 1.

FIG. 2 is a block diagram showing the configuration of components in a computer system which realizes the multi-media E-mail system shown in FIG. 1.

In FIG. 2, the computer system is provided with a display 201, a video RAM 202, a speaker 203, a network interface 204, a keyboard 205, a CPU 206, a main storing device 207, an external storing device 208, an audio inputting device 209, a pointing device 210, and an images inputting device 211.

The display 201 displays text (text information) and images (image information). The speaker 203 outputs audio information. The network interface 204 is an interface device for connecting the computer system to a not-shown network. The keyboard 205 responds to a user's key touch, and inputs codes (text data) corresponding thereto into the CPU 206. The audio inputting device 209 includes a microphone or A/D converter, for example, and inputs audio data into the CPU 206. The pointing device 210 includes a mouse, for example, and inputs data indicating a pointer's trail (handwriting), for example, into the CPU 206 responding to the user's operation. The images inputting device 211 includes a scanner or TV camera, for example, and inputs image data into the CPU 206.

The external storing device 208 includes a hard disk or optical disk, for example, and stores the data to be inputted into the CPU 206. The main storing device 207 stores data for the CPU 206 to operate, which may be the data in the foregoing (except image data) or intermediate data to be generated in the process. The video RAM 202 stores the image data.

The external storing device 208 stores program data for realizing processing as shown in the flowchart of FIG. 1. The program data stored in the external storing device 208 is transferred to the main storing device 207 when mails are transmitted/received. The CPU 206 controls each of the devices according to the program data stored in the main storing device 207, and thus such operational environment shown in the flowchart of FIG. 1 can be realized on the computer system.

There are three ways to store program data in the external storing device 208. First, read program data from a recording medium on which the program data is stored, and then store the program data in the external storing device 208. Second, receive program data transmitted through a network, and store the program data in the external storing device 208. Third, store program data in the external storing device 208 prior to shipment of the computer system.

It is now described how such computer system is operated to transmit/receive the multi-media E-mail through the network by referring to the flowchart of FIG. 1.

To a not-shown network, other computer systems identical in structure to the computer system in FIG. 2 are plurally connected. With the other computer systems, the computer system in FIG. 2 exchanges the multimedia E-mail through the network.

The multi-media E-mail to be exchanged herein includes various types of media information being temporally and/or spatially related to one another as is the mail described in the Background Art. Specifically, the mail includes various types of media information (objects) such as text, images, audio, and control information indicating how these objects are temporally and/or spatially related to one another. The objects are identified by the object identifiers (see Background Art for details).

Note that, unlike the conventional systems, when sending a return mail back to the sender, the computer systems do not transmit objects possessed by the computer system on the sender side but the rest and the control information.

Each of the computer systems stores not only objects included in outgoing mails (transmitted objects) and objects included in incoming mails (received objects) but transmission historical information indicating which object was transmitted to which computer system and receipt historical information indicating which object came from which computer system.

It is herein assumed that the computer system in FIG. 2 is activated to transmit/receive mails.

In FIG. 1, the computer system in FIG. 2 judges whether or not any mail from the other computer systems is received (step S101).

If not, the procedure advances to step S110.

If yes, the computer system then judges whether or not the incoming mail is a return mail (step S102). This judgement is done by referring to its own transmission historical information. When the incoming mail includes any object transmitted by itself before, the computer system judges the mail as being a return mail. If not, the mail is judged as not.

If the mail is not judged as being a return mail in step S102, the procedure advances to step S104.

Otherwise, according to the control information included in the return mail, the computer system temporally and/or spatially repositions (new) objects included therein and transmitted objects stored in itself so as to restore the return mail (step S103). Thereafter, the procedure goes to step S104. In step S103, the return mail is restored in a similar manner to the Background Art except that the transmitted objects stored in the computer system are used.

In step S104, any new object included in the incoming mail is stored, and the receipt historical information is accordingly updated.

Thereafter, the computer system presents the incoming mail to the user via the display 201 and the speaker 203 (step S105).

The user then views/listens the presented incoming mail. In either case of composing a return mail or terminating mail transmission/receipt, he/she accordingly taps on the keyboard 205 to instruct the computer system.

After presenting the incoming mail, the computer system judges whether or not any instruction to compose a return mail is inputted (step S106).

If not, the procedure advances to step S110.

If yes, the computer system then composes a return mail (step S107), and then transmits the composed return mail to the computer system on the sender side, from which the incoming mail was transmitted (hereinafter, referred to as recipient)(step S108).

Figure 28:
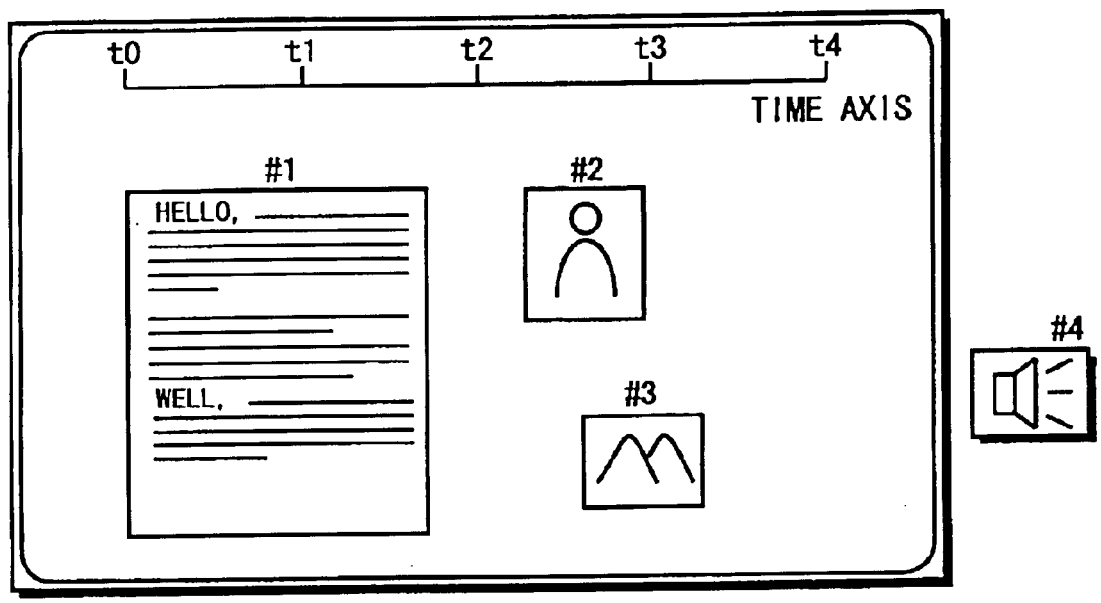
FIG. 28 is a diagram showing an exemplary multi-media E-mail displayed in the mail-composing window in FIG. 27, which is composed by the inputted information editing part 2506 in FIG. 25 (in the first and second embodiments, this mail is regarded as an incoming mail)
Figure 29:
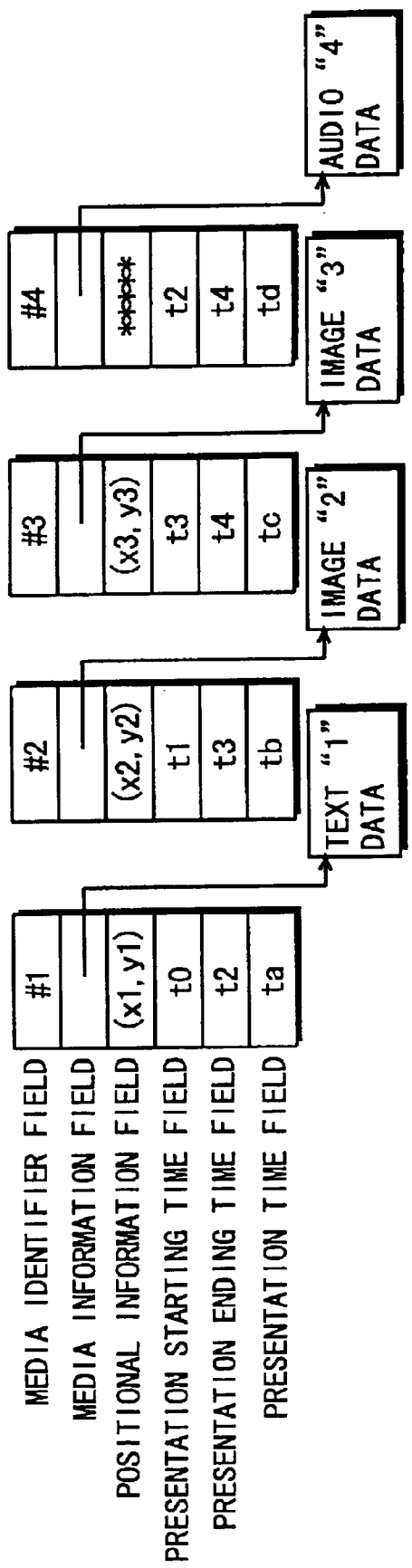
FIG. 29 is a diagram showing the internal data structure of the multi-media E-mail (mail in FIG. 28) composed by the inputted information editing part 2506 in FIG. 25.

It is now described in detail how the return mail is composed in step S107, and how the return mail is transmitted in step S108. It is herein assumed that the incoming mail is the mail shown in FIG. 28, and is responded by the return mail composed and transmitted to the sender (of the mail in FIG. 28). Note that, the mail in FIG. 28 is presumably newly composed by the sender (recipient). The data structure thereof is shown in FIG. 29.

First, an outline of these steps is given.

So far, it has been common for the user to edit and process an incoming mail to compose a return mail. When text in the incoming mail includes any question, the user may write his/her answer directly into the text, or when the incoming mail comes with any image attached, the user may interchange the image with another, for example. Through such editing and processing, the user can himself/herself save some work.

Especially, where the multi-media E-mail, as shown in FIG. 28, including various types of media information (objects) and control information indicating when and where to present each object is concerned, such editing and processing will become more common. Otherwise, the user has to annoyingly input and specify various types of media information when and where to present.

If this is the case, (I) when the multi-media E-mail, as shown in FIG. 28, including various types of media information (objects) and control information indicating when and where to present each object is received, the return mail is composed by editing and processing the multi-media E-mail (in the first embodiment, editing and processing mean adding/deleting objects and changing temporal and/or spatial relationship among objects). Accordingly, the return mail can be composed in an easier manner.

Further, (II) when the composed return mail is transmitted to the recipient, mail transmission is controlled in the following manner to reduce volume of data going through the network. To be specific, as an alternative to the composed return mail (the objects and the control information indicating when and where to present each object), only newly-added objects (if any) and the control information indicating how each object is temporally and/or spatially relating to one another included in the return mail are(is) transmitted. This is because, as the recipient possesses the transmitted objects, the new objects and the control information are sufficient for the recipient to restore the return mail. Accordingly, volume of data going through the network will be considerably reduced at the time of mail transmission.

Second, steps S107 and S108 are described in more detail.

Figure 27:
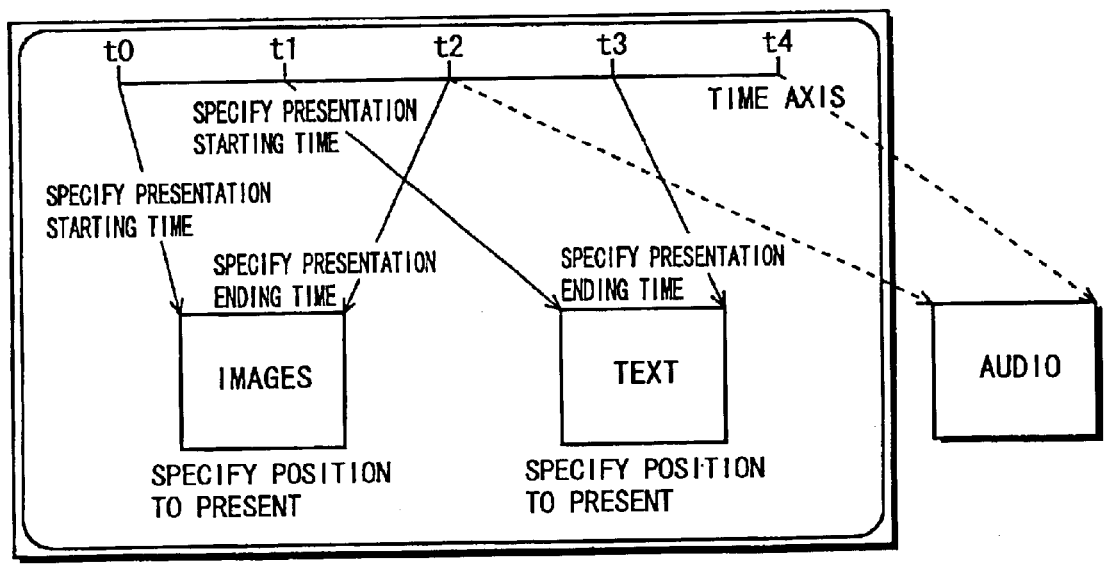
FIG. 27 is a diagram showing the visualized structure of a mail-composing window used in the inputted information editing part 2506 in FIG. 25 (also is used to compose return mails in the first to seventh embodiments)

Herein, a mail-composing window to be presented on the display 201 to compose the return mail is structurally identical to the one in FIG. 27.

Figure 3:
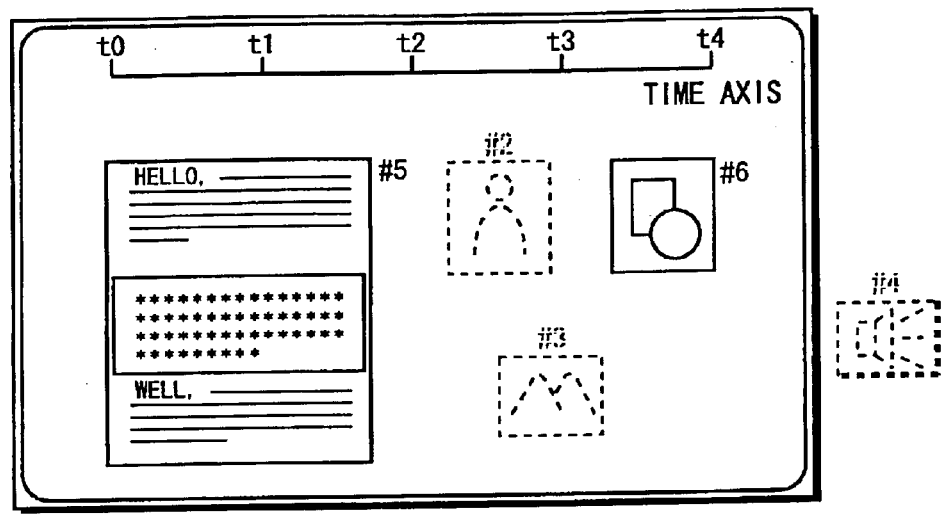
FIG. 3 is a diagram showing an exemplary case where a return mail composed by editing/processing an incoming mail in FIG. 28 is displayed in a mail-composing window in FIG. 27.

FIG. 3 is a diagram showing an exemplary case where a return mail composed by editing/processing the incoming mail in FIG. 28 is displayed in the mail-composing window in FIG. 27.

Figure 4:
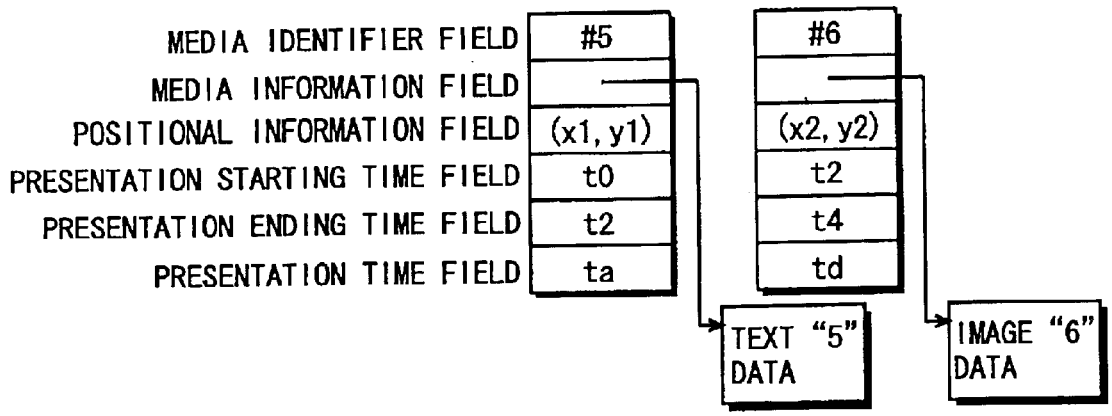
FIG. 4 is a diagram showing the internal data structure of the return mail (mail in FIG. 3) composed by editing/processing the incoming mail in FIG. 28.

FIG. 4 is a diagram showing the internal data structure of the return mail (mail in FIG. 3) composed by editing/processing the incoming mail in FIG. 28.

Figure 5:
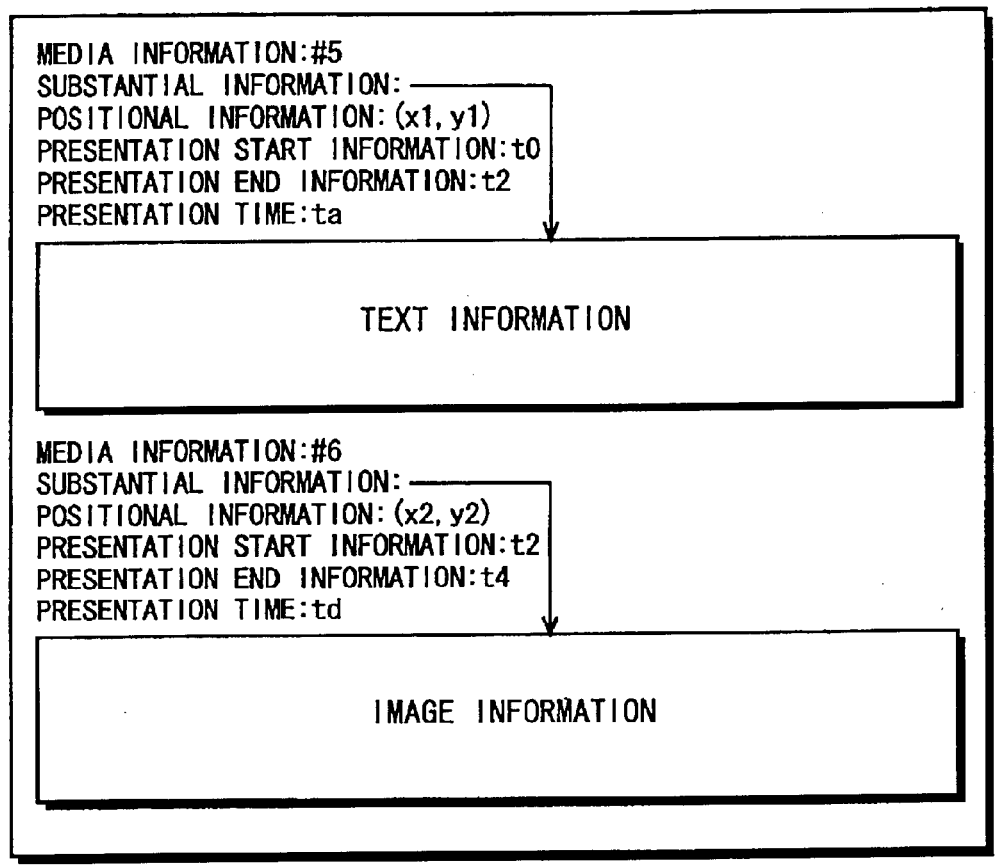
FIG. 5 is a diagram showing the data structure of the return mail (mail in FIG. 3) at the time of mail transmission, which is composed by editing/processing the incoming mail in FIG. 28.

FIG. 5 is a diagram showing the data structure of the return mail (mail in FIG. 3) at the time of mail transmission, which is composed by editing/processing the incoming mail in FIG. 28.

Note that reference characters "# number" appear in the drawings are the object identifiers for identifying the inputted information (objects).

It is herein assumed that the user has received the multi-media E-mail shown in FIG. 28, and is about to compose a return mail therefor.

The user taps out text on the keyboard 205, for example, while looking at the display 201 on which the mail in FIG. 28 is displayed, and then instructs the computer system to interchange a specific part of the object #1 (text "1") with the tapped-out text.

In response thereto, the computer system inputs the text, interchanges the specific part of the object #1 with the inputted new text data, and then provides a new identifier #5 for a newly-obtained object #1. Thereafter, the newly-obtained object #1 is identified as an object #5 (text "5").

Next, the user instructs the computer system to delete the object #2 (image "2" image of human body) and the object #3 (image "3"; image of landscape). In response thereto, the computer system deletes the objects #2 and #3 in the mail-composing window.

Then, the user operates the images inputting device 211 to take in any pictorial information. In response thereto, the computer system inputs images, and then provides an identifier #6 for the inputted new pictorial images (image "6"). Thereafter, the new image "6" is identified as an object #6, and is inserted into a specified position in the mail-composing window.

If the user wants to change the positions of the objects #5 and #6 in the return mail with each other, he/she just needs to accordingly instruct the computer system. In response thereto, the computer system executes processing required to change the positions thereof.

In this manner, the return mail shown in FIG. 3 is composed. The return mail is displayed on the display 201 for the user's confirmation.

The return mail in FIG. 3 has such internal data structure as shown in FIG. 4. The structure shown in FIG. 4 is identical to the one in FIG. 29 (Background Art).

Next, the user instructs the computer system to transmit such return mail. In response thereto, the computer system structures the composed return mail in a predetermined format for an outgoing mail (see FIG. 5), and transmits the return mail to the computer system on the recipient side (the sender side from which the incoming mail was transmitted).

The user is now through steps S107 and S108.

The transmitted return mail goes through the network and reaches the computer system on the recipient side. The computer system on the recipient side receives the return mail, executes processing in a similar manner to steps S101 to S105, and then restores the return mail as shown in FIG. 3. Thereafter, the computer system presents the restored mail to the recipient.

Referring back to FIG. 1, the computer system in FIG. 2 then stores the new objects included in the return mail composed and transmitted in steps S107 and 108, and accordingly updates the transmission historical information (step S109). Then, the procedure goes to step S110.

In step S110, the computer system judges whether or not any instruction is inputted to terminate the mail transmission/receipt. If not, the procedure returns to step S101 and repeats the processing in the foregoing. If yes, the computer system terminates the mail transmission/receipt.

As is known from the above, the computer system in FIG. 2 composes a return mail by utilizing objects (received objects) included in a received mail (incoming mail), and then structures the composed return mail in a form for a multi-media E-mail which includes every object in the return mail exclusive of the already-utilized received objects and control information relevant to every object in the return mail, and then transmits the mail to the computer system on the recipient side.

In this case, in accordance with the control information included in the received multi-media E-mail., the computer system on the recipient side can restore the incoming mail by positioning the objects included in the multi-media E-mail and the objects (received objects) included in the transmitted incoming mail.

Therefore, the computer system in FIG. 2 can transmit/receive, to/from the other computer systems through a network, a multi-media E-mail including objects which are temporally and/or spatially related to one another. Further, in this manner, volume of data going through the network can be reduced as the already-utilized objects (received objects) do not go through the network twice.

Still further, when the computer system in FIG. 2 receives a return mail, the system positions objects included in the multi-media E-mail and objects (transmitted objects) included in the mail before-transmitted by itself in accordance with the control information included in the received multi-media E-mail. In this manner, the received mail (return mail) can be restored.

By comparing FIG. 28 with FIG. 3, it is known that text (object #5) in the return mail in FIG. 3 is different from text (object #1) in the incoming mail in FIG. 28 in data partially interchanged with another. If this is the case, in the first embodiment, data in the text included in the return mail is entirely transmitted as a new object #5. In a second embodiment next below, however, only the interchanged data will be transmitted so as to reduce volume of data going through a network to a greater extent.

(Second Embodiment)

A multi-media E-mail system according to the second embodiment of the present invention is similar to the multi-media E-mail system according to the first embodiment shown in the flowchart of FIG. 1, but is different in step S103 of restoring a mail, in step S107 of composing a return mail, and in step S108 of transmitting the return mail. Details will be described later.

The structure of components in a computer system which realizes the multimedia E-mail system according to the second embodiment of the present invention is identical to the one in FIG. 2.

Therefore, the following description is made by referring to FIGS. 1 and 2, and any matter similar to the first embodiment is not described again.

It is now described step S107 of composing a return mail and step S108 of transmitting the return mail in FIG. 1. Herein, it is assumed that an incoming mail is the mail shown in FIG. 28, and is responded by a return mail composed and transmitted to the sender (of the mail in FIG. 28).

First, an outline of these steps is given.

In the first embodiment, (I) where the multi-media E-mail, as shown in FIG. 28, including various types of media information (objects) and control information indicating when and where to present each object is concerned, it is common for a user to compose a return mail by editing and processing the multi-media E-mail (editing and processing herein mean adding/deleting objects and changing temporal and/or spatial relationship among objects).

Further, (II) when the composed return mail is transmitted back to the sender, mail transmission is controlled in the following manner to reduce volume of data going through a network. To be specific, as an alternative to the composed return mail (the objects and the control information indicating when and where to present each object), only newly-added objects (if any) and the control information indicating how each object is temporally and/or spatially relating to one another included in the return mail are(is) transmitted.

In the second embodiment, on the other hand, in (I), any one object is divided into pieces when the return mail is composed. In this manner, one or more divided pieces can be deleted or a new object can be inserted between the divided pieces (dividing position).

Further, in (II), if any object is divided, dividing object information indicating which object is divided at where is additionally transmitted.

Accordingly, even if any one object is partially deleted or changed when the return mail is composed and transmitted, there is no more need to transmit entire data thereof. Accordingly, volume of data going through the network can be reduced to a greater extent than the first embodiment.

Second, steps S107 and S108 are described in more detail.

Herein, a mail-composing window to be displayed on the display 201 to compose a return mail is structurally identical to the one in FIG. 27.

Figure 6:
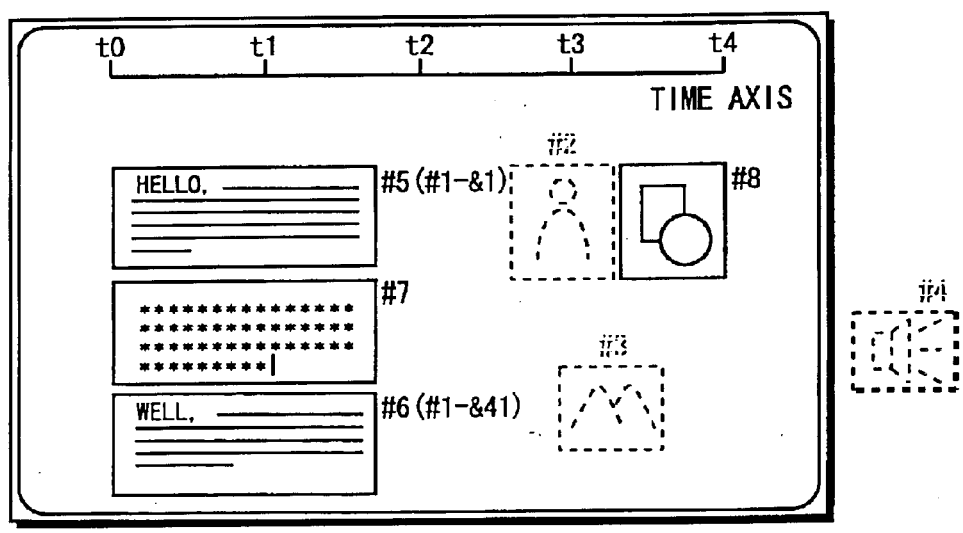
FIG. 6 is a diagram showing another exemplary case where the return mail composed by editing/processing the incoming mail in FIG. 28 is displayed in the mail-composing window in FIG. 27.

FIG. 6 is a diagram showing another exemplary case where the return mail composed by editing/processing the incoming mail in FIG. 28 is displayed in the mail-composing window in FIG. 27.

Figure 7:
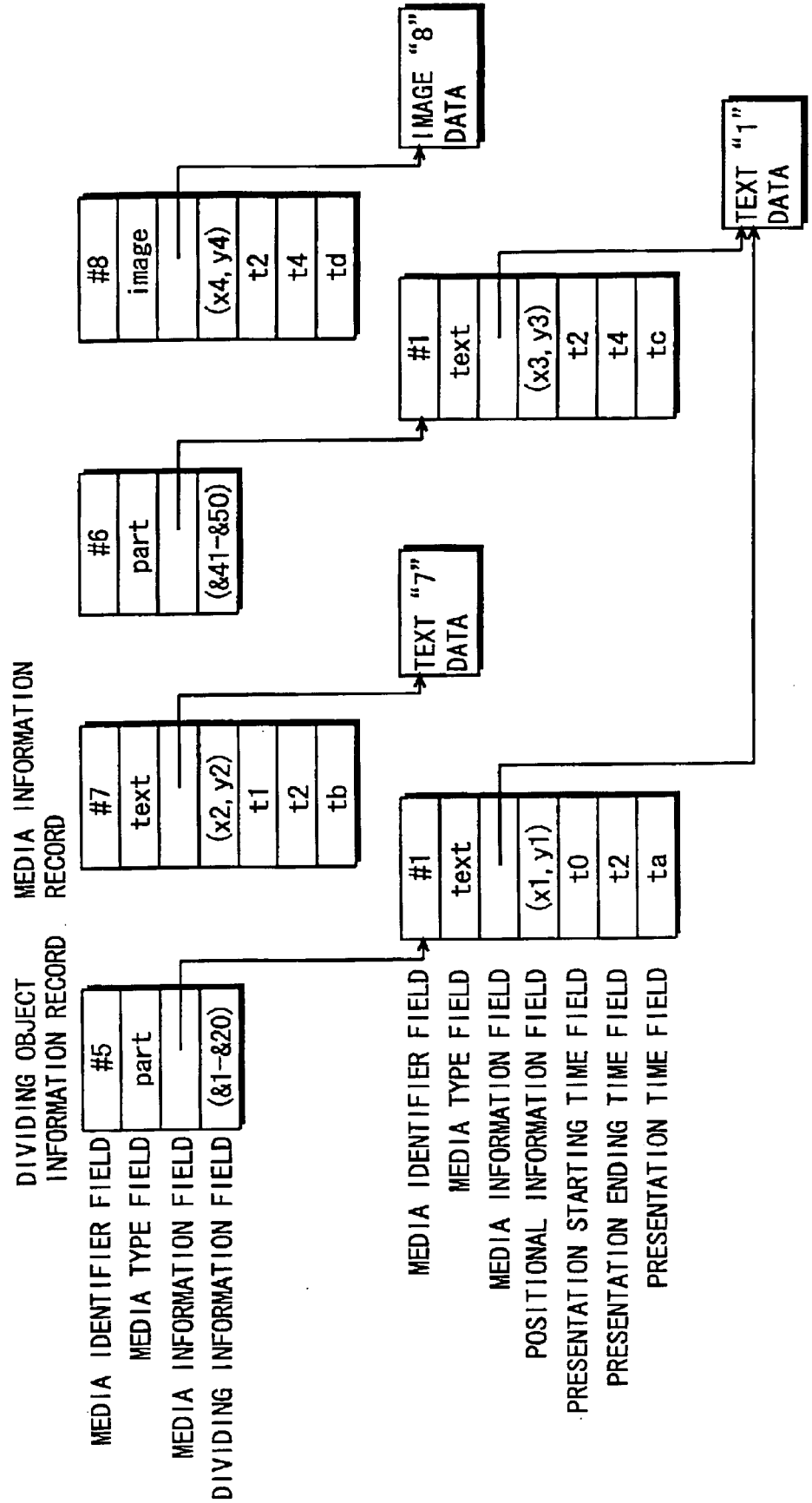
FIG. 7 is a diagram showing the internal data structure of the return mail (mail in FIG. 6) by editing/processing the incoming mail in FIG. 28.

FIG. 7 is a diagram showing the internal data structure of the return mail (mail in FIG. 6) composed by editing/processing the incoming mail in FIG. 28.

Figure 8:
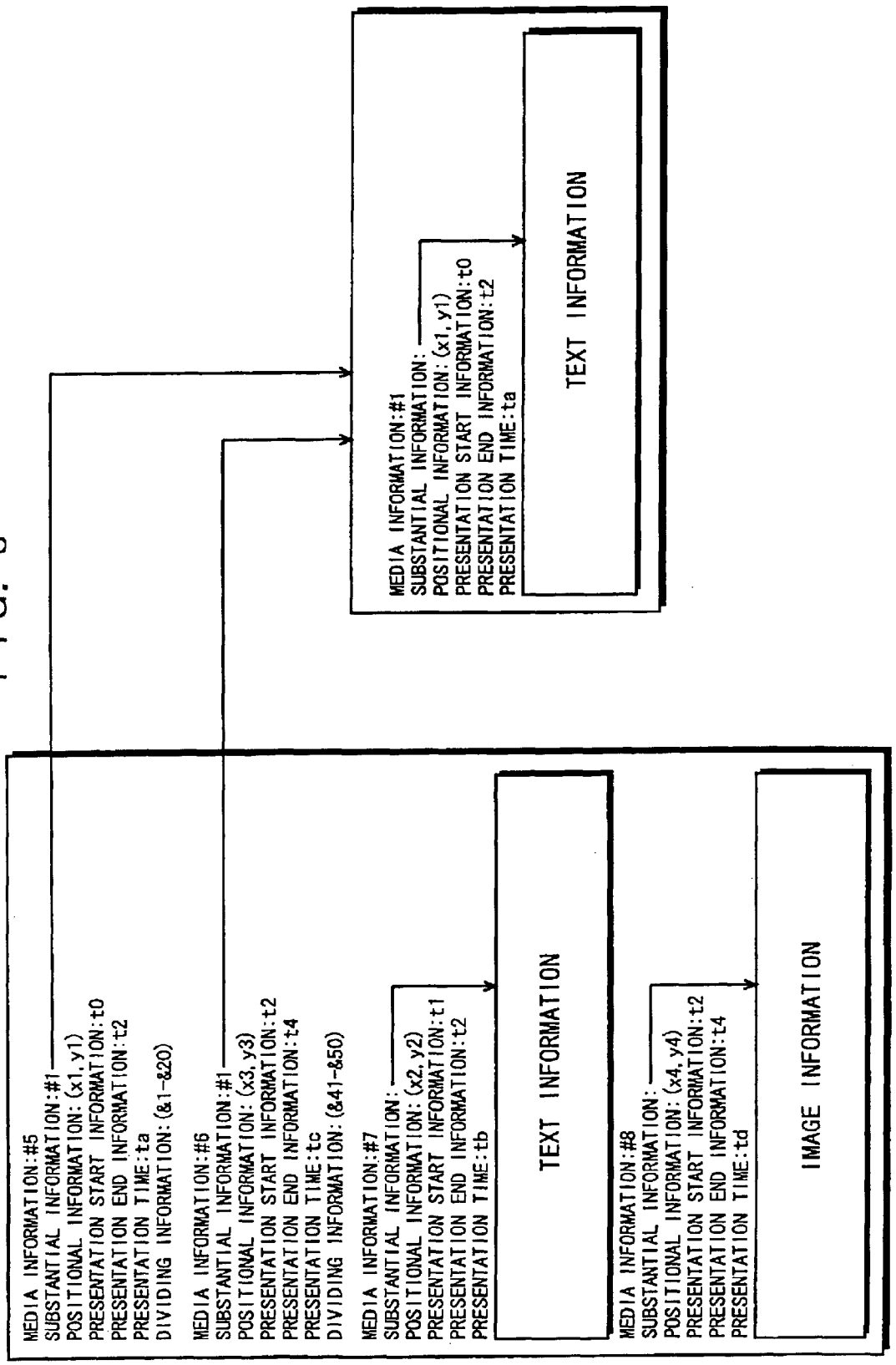
FIG. 8 is a diagram showing the data structure of the return mail (mail in FIG. 6) at the time of mail transmission, which is composed by editing/processing the incoming mail in FIG. 28.

FIG. 8 is a diagram showing the data structure of the return mail (mail in FIG. 6) at the time of mail transmission, which is composed by editing/processing the incoming mail in FIG. 28.

Herein, reference characters "& number" appear in FIGS. 6 to 8 each indicates an address from the beginning of an object. When the object is text, for example, the address is denoted by a text number or line number provided in order from the beginning of the object, and when the object is images, for example, the address is denoted by a sampling number. The sampling number herein is a number provided for sampling data constituting the images in temporally ascending order.

It is assumed herein that a user has received the multi-media E-mail shown in FIG. 28 and is about to compose a return mail therefor.

The user taps out text on the keyboard 205, for example, while looking at the display 201 on which the mail in FIG. 28 is displayed, and then instructs the computer system to interchange a specific part of the object #1 with the tapped-out text.

In response thereto, the computer system inputs the text, and then interchanges the specific part of the object #1 with the inputted new text data.

Hereinafter, it is described how data of the object #1 is partially interchanged with another.

The user taps on the keyboard 205, for example, to specify the dividing position of the object #1.

Figure 9:
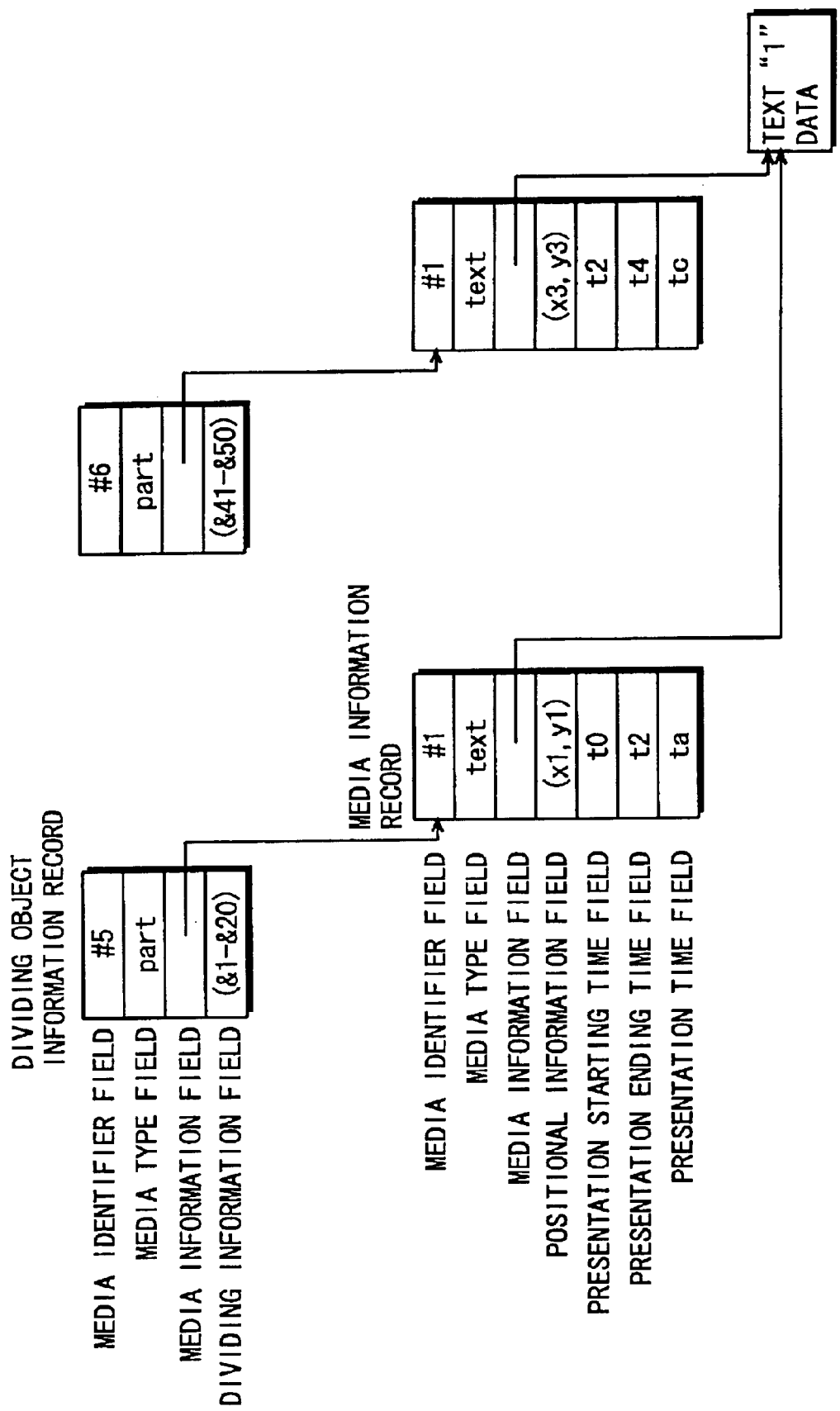
FIG. 9 is a diagram showing exemplary dividing object information (information relevant only to division is taken out from the internal data structure of the return mail in FIG. 6)

In response thereto, the computer system first generates dividing object information as shown in FIG. 9. The dividing object information in FIG. 9 is obtained by taking out information relevant only to division from the internal data structure of the return mail in FIG. 7.

In FIG. 9, the dividing object information includes a media information record and a dividing object information record.

The media information record is structured by: a media identifier field storing media identifiers (# number) uniquely identifying the media information; a media type field storing type of the media information (text, image, and the like); a media information field storing substance (actual information) of the media information (note that, the media information field stores an address where the media information substance is); a positional information field storing a position (coordinates) where the media information is presented; a presentation starting time field storing starting time for the media information to be presented; a presentation ending time field storing ending time for the media information being presented; and a presentation time field storing presentation time of the media information.

On the other hand, the dividing object information record is structured by: the media identifier field storing media identifiers uniquely identifying the media information; the media type field storing type of the media information; the media information field storing substance of the media information (note that, this media information field includes an address where the media information record is); and a dividing information field storing dividing information of the media information.

In this example, two objects obtained by dividing the object #1 are identified as the objects #5 and #6. Moreover, the objects #2 to #4 are deleted in a similar manner to the first embodiment.

Figure 10:
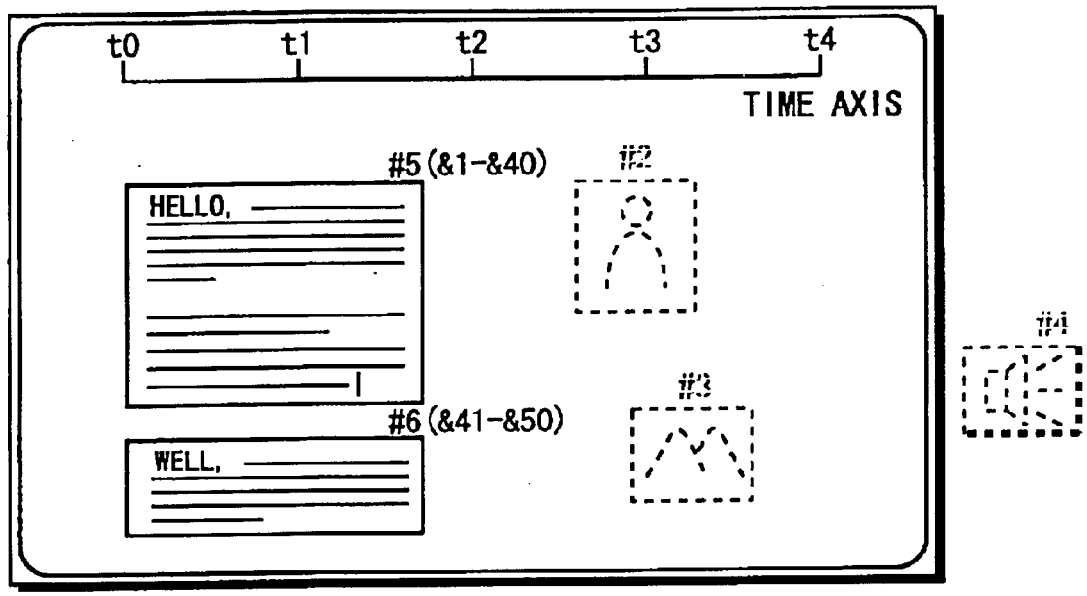
FIG. 10 is a diagram showing a case where divided objects generated by the dividing object information in FIG. 9 is displayed in the mail-composing window in FIG. 27.

The computer system then generates divided objects to be handled in the mail-composing window as shown in FIG. 10 by referring to the dividing object information (see FIG. 9).

In FIG. 10, an end of the second paragraph (denoted by "I" in the drawing) in the object #5 is specified, whereby the object #1 included in the incoming mail is accordingly divided into the object #5 (addresses &1 to &40) and the object #6 (addresses &41 to &50).

Figure 11:
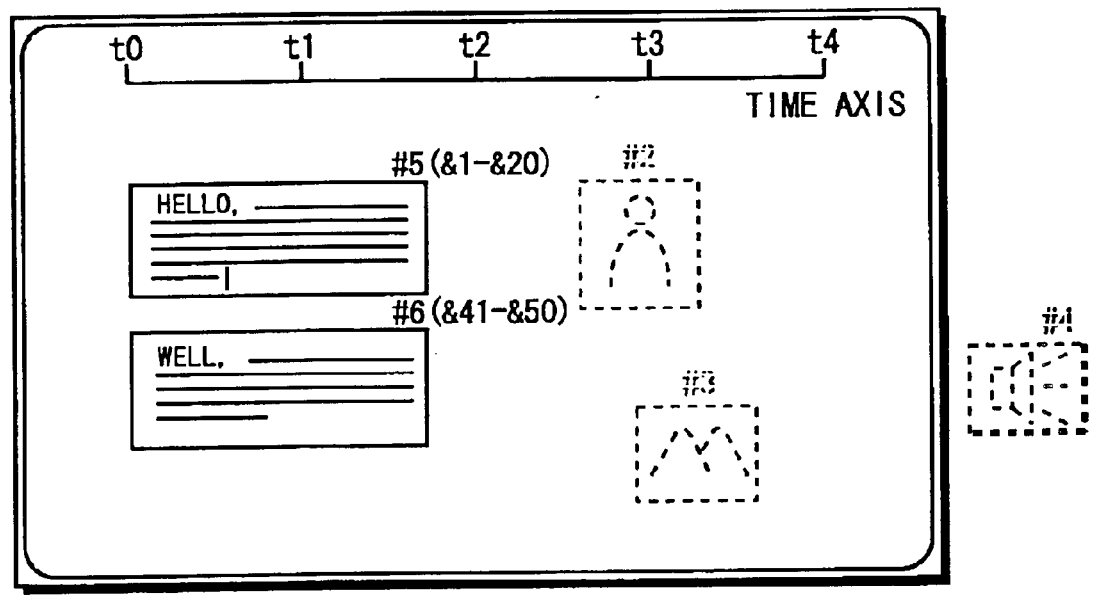
FIG. 11 is a diagram showing a case where an object #5 among the divided objects in FIG. 10 is partially deleted.

Thereafter, as shown in FIG. 11, the second paragraph of the object #5 is deleted. Then a new object #7 is inserted between the objects #5 and #6, where the deleted second paragraph was.

When the second paragraph of the object #5 is deleted, the dividing object information shown in FIG. 9 is generated according to the dividing position specified by the user. In FIG. 9, the second paragraph of the object #5 (addresses &21 to &40) is deleted, and then in a newly-obtained object #5 (without the deleted second paragraph), the object #7 is inserted after the first paragraph (addresses &1 to &20).

Thereafter, inputted information relevant to the addresses &21 to &40 of the object #5 is accordingly updated, then the updated inputted information (text data) is stored.

In this manner, the data of the object #1 is partially interchanged with another.

Next, the user operates the images inputting device 211 and takes in any pictorial information. In response thereto, the computer system inputs images, and then provides an identifier #8 for the inputted new pictorial images (image "8"). Thereafter, the new image "8" is identified as an object #8. Then, the object "8" is inserted into a specified position in the mail-composing window.

In this manner, the return mail as shown in FIG. 6 is obtained. The return mail is displayed on the display 201 for the user's confirmation.

The return mail in FIG. 6 has the internal data structure as shown in FIG. 7.

Thereafter, the user instructs the computer system to transmit the return mail. In response thereto, the computer system structures the return mail (new objects, control information, and dividing object information) in a predetermined format for an outgoing mail (see FIG. 8), then transmits the mail to the computer system on the recipient side.

In step S103 of restoring a mail, divided objects are generated by referring to the dividing object information included in the received mail. This processing is executed in a similar manner to step S107.

As is known from the above, the computer system in FIG. 2 divides any one object when composing the return mail. In this manner, one or more divided objects obtained after the division can be deleted or a new object can be inserted between the divided objects (dividing position). Further, the computer system in FIG. 2 additionally transmits the dividing object information indicating which object was divided at where. Therefore, there is no more need to transmit entire data of the deleted or changed object. Accordingly, volume of data going through the network can be reduced to a greater extent than the first embodiment.

Still further, when receiving a return mail, the computer system in FIG. 2 divides any object (transmitted objects) included in the mail before-transmitted by itself according to the dividing object information included in the return mail (multi-media E-mail), and then positions the objects included in the return mail (multi-media E-mail) and the divided objects obtained by dividing the transmitted objects according to the control information included in the return mail (multi-media E-mail). In this manner, the incoming mail (return mail) can be restored.

(Third Embodiment)

A multi-media E-mail system according to a third embodiment of the present invention is similar to the multi-media E-mail system according to the second embodiment shown in the flowchart of FIG. 1, but is different in step S107 of composing a return mail, and in step S108 of transmitting the return mail. Details will be described later.

The structure of components in a computer system which realizes the multi-media E-mail system according to the third embodiment of the present invention is identical to the one in FIG. 2.

Therefore, the following description is made by referring to FIGS. 1 and 2, and any matter similar to the second embodiment is not described again.

It is now described in detail step S107 of composing a return mail and step S108 of transmitting the return mail in FIG. 1. Herein, by referring to FIGS. 12 to 14, it is assumed that an incoming mail is the mail shown in FIG. 12, and is responded by a return mail composed and transmitted to the sender (of the mail in FIG. 12).

Herein, a mail-composing window to be displayed on the display 201 to compose the return mail is structurally identical to the one in FIG. 27.

Figure 12:
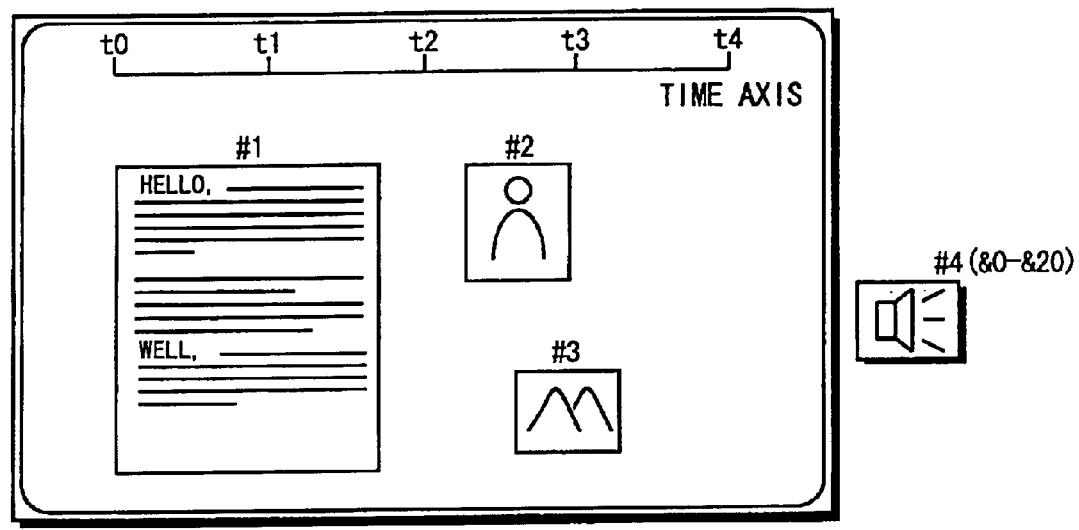
FIG. 12 is a diagram exemplarily showing an incoming mail.

FIG. 12 is a diagram showing an exemplary case where a received multi-media E-mail is displayed on the mail-composing window in FIG. 27.

Figure 13:
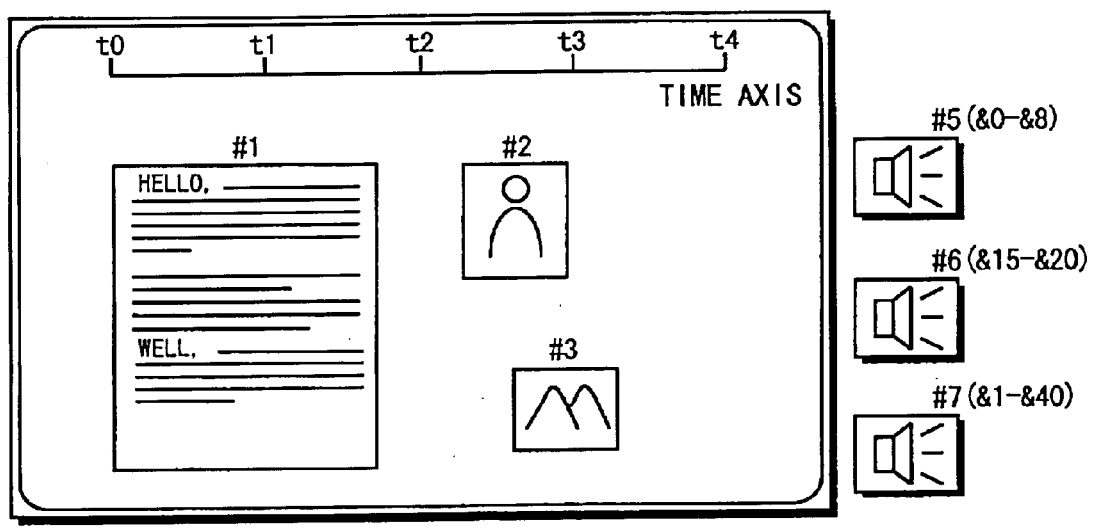
FIG. 13 is a diagram showing an exemplary return mail composed for the incoming mail in FIG. 12.

FIG. 13 is a diagram showing a case where the return mail composed by editing and processing the incoming mail shown in FIG. 12 is displayed on the mail-composing window in FIG. 27.

Herein, reference characters "& number" appear in FIGS. 12 to 13 each indicates an address from the beginning of an object. When the object is audio, for example, the address is denoted by a sampling number. The sampling number herein is a number provided for sampling data constituting audio in temporally ascending order.

It is assumed herein that a user has received the multi-media E-mail shown in FIG. 12 and is about to compose a return mail therefor.

The user first instructs the computer system to delete a specific part of an object #4 (audio "4") while looking at the display 201 on which the mail in FIG. 12 is displayed. Next, the user operates the audio inputting device 209 so as to record audio information, then instructs the computer system to attach the newly-recorded audio information to the mail and transmit.

In response thereto, the computer system inputs the audio, and provides a new identifier #7 for the inputted new audio ("audio "7"). Thereafter, the new audio "7" is identified as an object #7.

Figure 14:
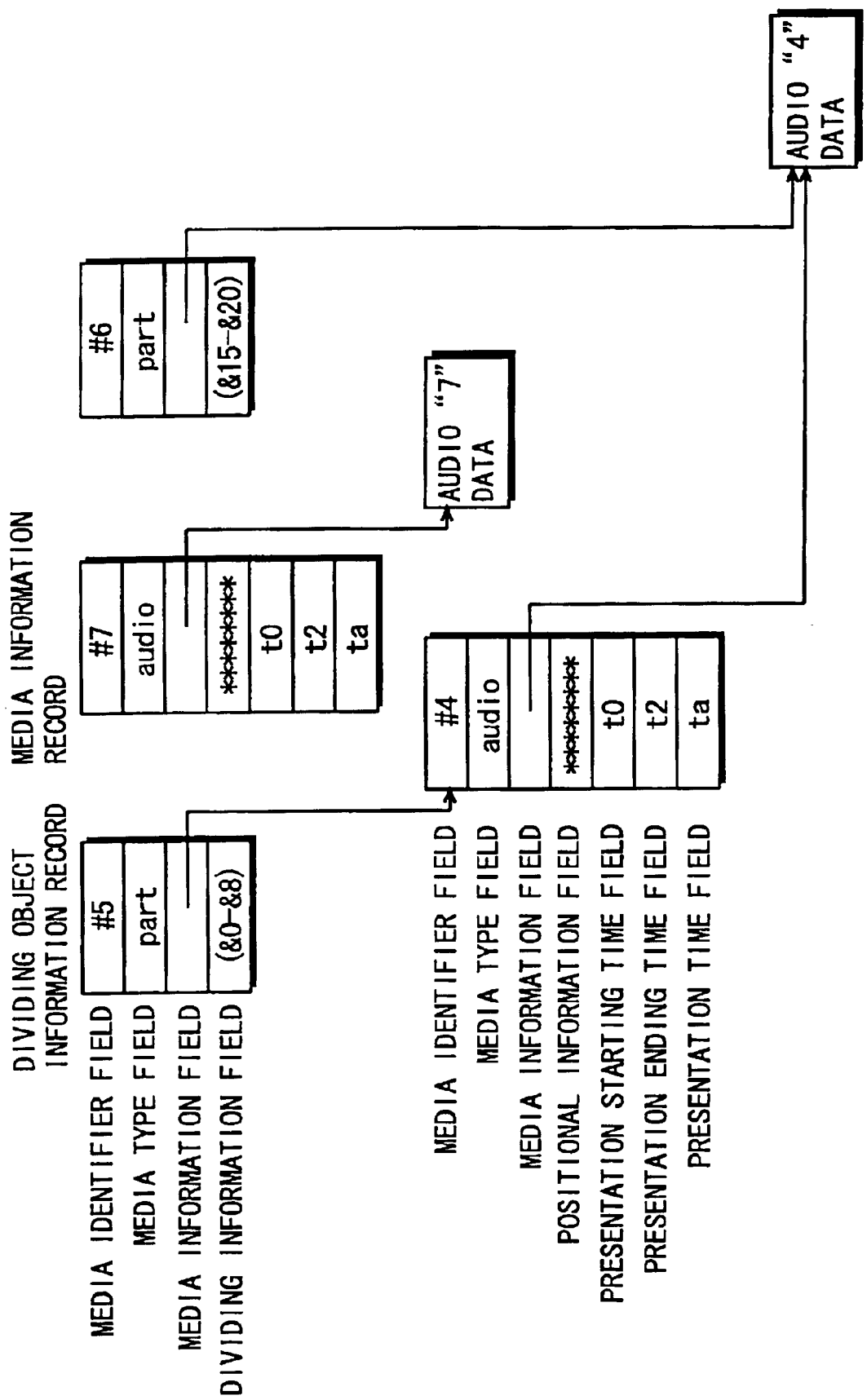
FIG. 14 is a diagram showing dividing object information for composing the return mail in FIG. 13 by editing/processing the incoming mail in FIG. 12.

Then, the computer system generates dividing object information as shown in FIG. 14, and then generates divided objects from the object #4 (received object) according to the dividing object information. To be specific, the object #4 in the mail-composing window is divided twice, immediately after the addresses &8 and &14, and one of the three objects obtained by the division (&0 to &8, &9 to &14, and &15 to &20) is deleted.

Herein, processing of dividing and deleting the objects is executed in a similar manner to the second embodiment.

In this manner, the return mail as shown in FIG. 13 can be obtained. This return mail is displayed on the display 201 for the user's confirmation.

Next, the user instructs the computer system to transmit such return mail. In response thereto, the computer system structures the generated return mail in a predetermined format for a return mail, and then transmits the mail to the computer system on the recipient side.

The user is now through steps S107 and S108.

(Fourth Embodiment)

A multi-media E-mail system according to a fourth embodiment of the present invention is similar to the multi-media E-mail system according to the second embodiment shown in the flowchart of FIG. 1, but is different in step S107 of composing a return mail, and in step S108 of transmitting the return mail. Details will be described later.

The structure of components in a computer system which realizes the multi-media E-mail system according to the fourth embodiment of the present invention is identical to the one in FIG. 2.

Therefore, the following description is made by referring to FIGS. 1 and 2, and any matter similar to the second embodiment is not described again.

It is now described step S107 of composing a return mail and step S108 of transmitting the return mail in FIG. 1. Herein, by referring to FIGS. 15 to 17, it is assumed that an incoming mail is the mail shown in FIG. 15, and is responded by a return mail composed and transmitted to the sender (of the mail in FIG. 15).

Herein, a mail-composing window to be displayed on the display 201 to compose a return mail is structurally identical to the one in FIG. 27.

Figure 15:
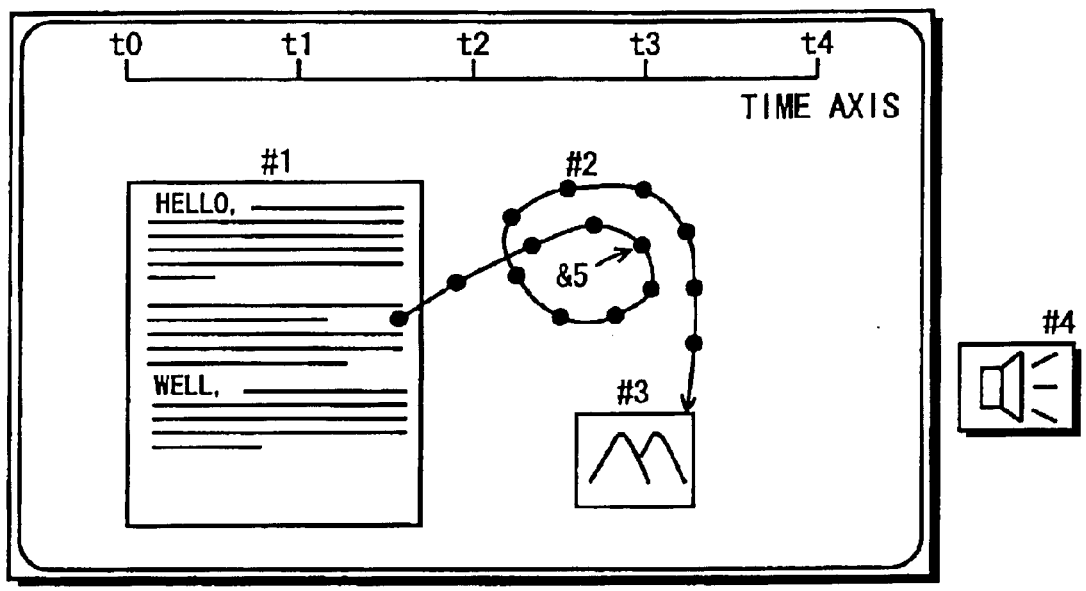
FIG. 15 is a diagram showing another exemplary incoming mail.

FIG. 15 is a diagram showing an exemplary case where a received multi-media E-mail is displayed on the mail-composing window in FIG. 27.

Figure 16:
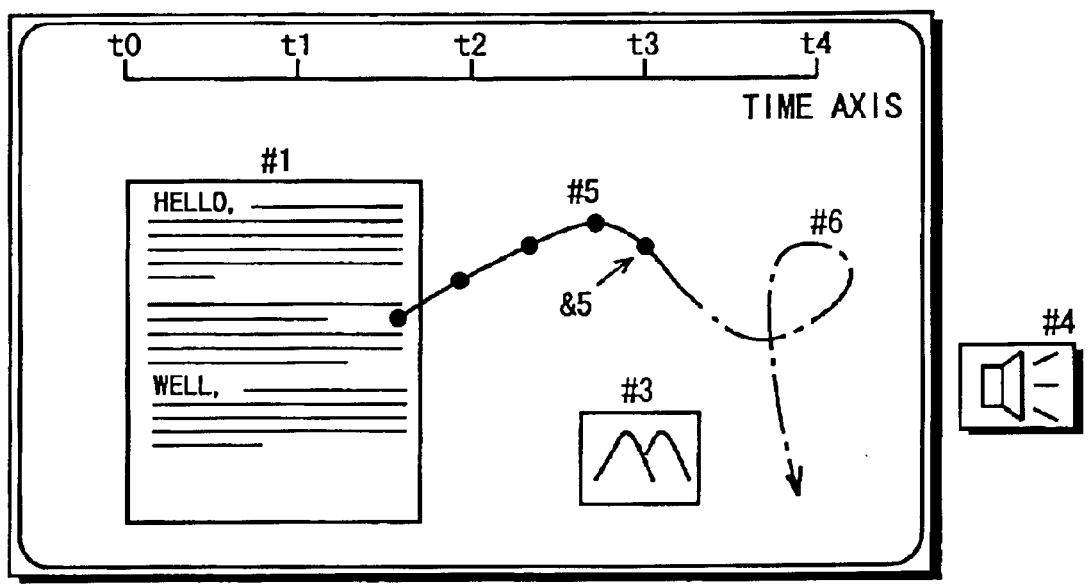
FIG. 16 is a diagram showing an exemplary return mail composed for the incoming mail in FIG. 15.

FIG. 16 is a diagram showing a case where the return mail composed by editing and processing the incoming mail shown in FIG. 15 is displayed on the mail-composing window in FIG. 27.

Herein, reference characters "& number" appear in FIGS. 15 and 16 each indicates an address from the beginning of an object.

When the object is handwriting (that is, trail of the pointing device 210), for example, the address is denoted by a sampling number. The sampling number herein is a number provided for sampling data constituting handwriting in temporally ascending order.

It is assumed herein that a user has received the multi-media E-mail shown in FIG. 15 and is about to compose a return mail therefor.

The user first operates the pointing device 210 to input handwriting information. Then, while looking at the display 201 on which the mail in FIG. 15 is displayed, the user instructs the computer system to interchange a specific part of the object #2 (handwriting "2") with the newly-inputted handwriting information.

In response thereto, the computer system inputs the handwriting, and then provides a new identifier #6 for the inputted new handwriting (handwriting "6"). Thereafter, the new handwriting "6" is identified as an object "6".

Figure 17:
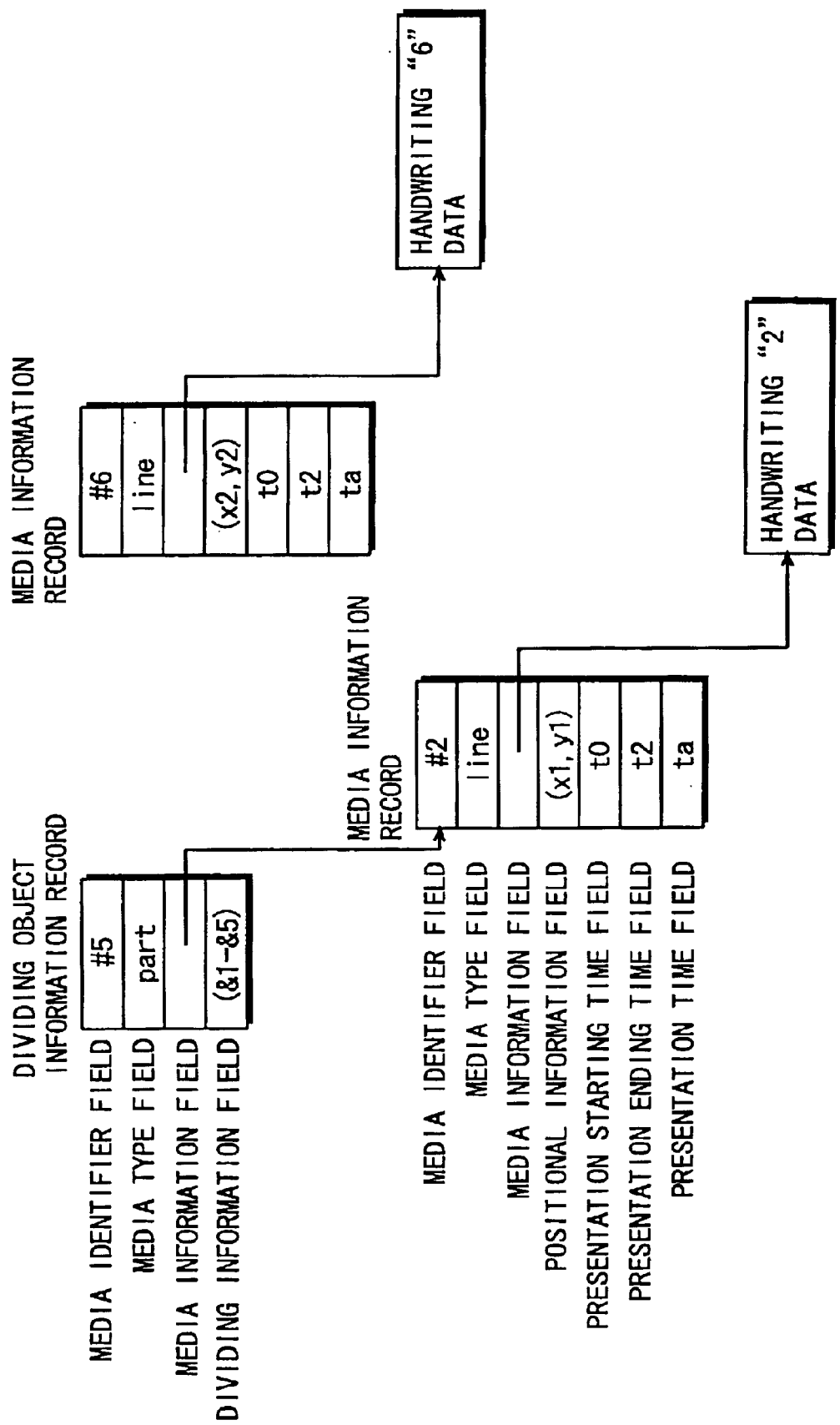
FIG. 17 is a diagram showing dividing object information for composing the return mail in FIG. 16 by editing/processing the incoming mail in FIG. 15.

The computer system then generates dividing object information as shown in FIG. 17, and then generates divided objects from the object #2 (received object) according to the dividing object information. To be specific, the object #2 in the mail-composing window is divided immediately after the address &5. Then one of the two objects (a part after the address &5) is deleted, and the other (a part between addresses &1 and &5) is provided with a new identifier #5. Thereafter, the object #6 is inserted into a position immediately after the object #5.

Herein, processing of dividing and deleting the objects is executed in a similar manner to the second embodiment.

In this manner, the return mail as shown in FIG. 16 can be obtained. This return mail is displayed on the display 201 for the user's confirmation.

Next, the user instructs the computer system to transmit such return mail. In response thereto, the computer system structures the return mail in a predetermined format for a return mail, and then transmits the mail to the computer system on the recipient side.

The user is now through steps S107 and S108.
(Fifth Embodiment)

A multi-media E-mail system according to a fifth embodiment of the present invention is similar to the multi-media E-mail system according to the second embodiment shown in the flowchart of FIG. 1, but is different in step S107 of composing a return mail, and in step S108 of transmitting the return mail. Details will be described later.

The structure of components in a computer system which realizes the multi-media E-mail system according to the fifth embodiment of the present invention is identical to the one in FIG. 2.

Therefore, the following description is made by referring to FIGS. 1 and 2, and any matter similar to the second embodiment is not described again.

It is now described in detail step S107 of composing are turn mail and step S108 of transmitting the return mail in FIG. 1. Herein, by referring to FIGS. 18 to 20, it is assumed that an incoming mail is the mail shown in FIG. 18, and is responded by a return mail composed and transmitted to the sender (of the mail in FIG. 18).

Herein, a mail-composing window to be displayed on the display 201 to compose a return mail is structurally identical to the one in FIG. 27.

Figure 18:
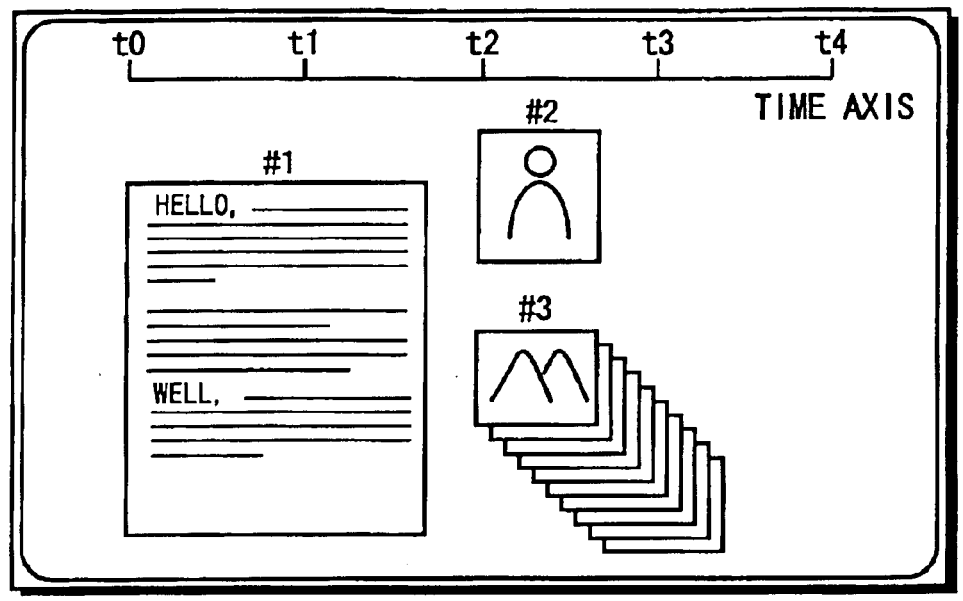
FIG. 18 is a diagram showing still another exemplary incoming mail.

FIG. 18 is a diagram showing an exemplary case where a received multi-media E-mail is displayed on the mail-composing window in FIG. 27.

Figure 19:
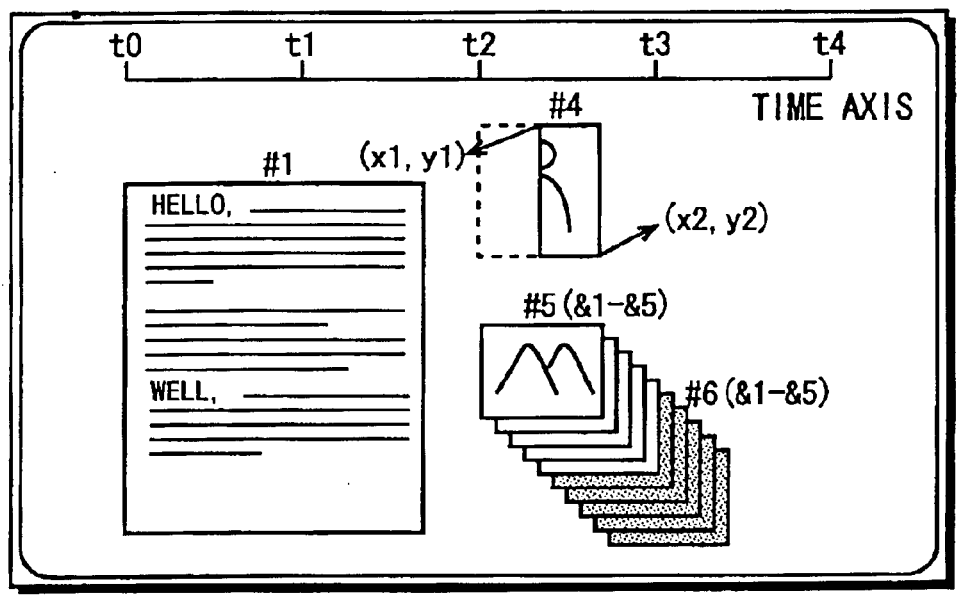
FIG. 19 is a diagram showing an exemplary return mail composed for the incoming mail in FIG. 18.

FIG. 19 is a diagram showing a case where the return mail composed by editing and processing the incoming mail shown in FIG. 18 is displayed on the mail-composing window in FIG. 27.

Herein, reference characters "& number" appear in FIGS. 18 and 19 each indicates an address from the beginning of an object. When the object is moving images, for example, the address is denoted by a frame number. The frame number herein is a number provided for frames constituting moving images in temporally ascending order.

It is assumed herein that a user has received the multi-media E-mail shown in FIG. 18 and is about to compose a return mail therefor.

The user first operates the images inputting device 211 to take in moving images. Then, while looking at the display 201 on which the mail in FIG. 18 is displayed, the user instructs the computer system to delete a specific part of the object #2 (still images "2"; still images of human body) and to interchange a specific part of the object #3 (moving images; moving images of landscape) with the newly taken-in moving images.

In response thereto, the computer system inputs the moving images, and then provides a new identifier #6 for the inputted new moving images (moving image "6"). Thereafter, the new moving image "6" is identified as an object #6.

Figure 20:
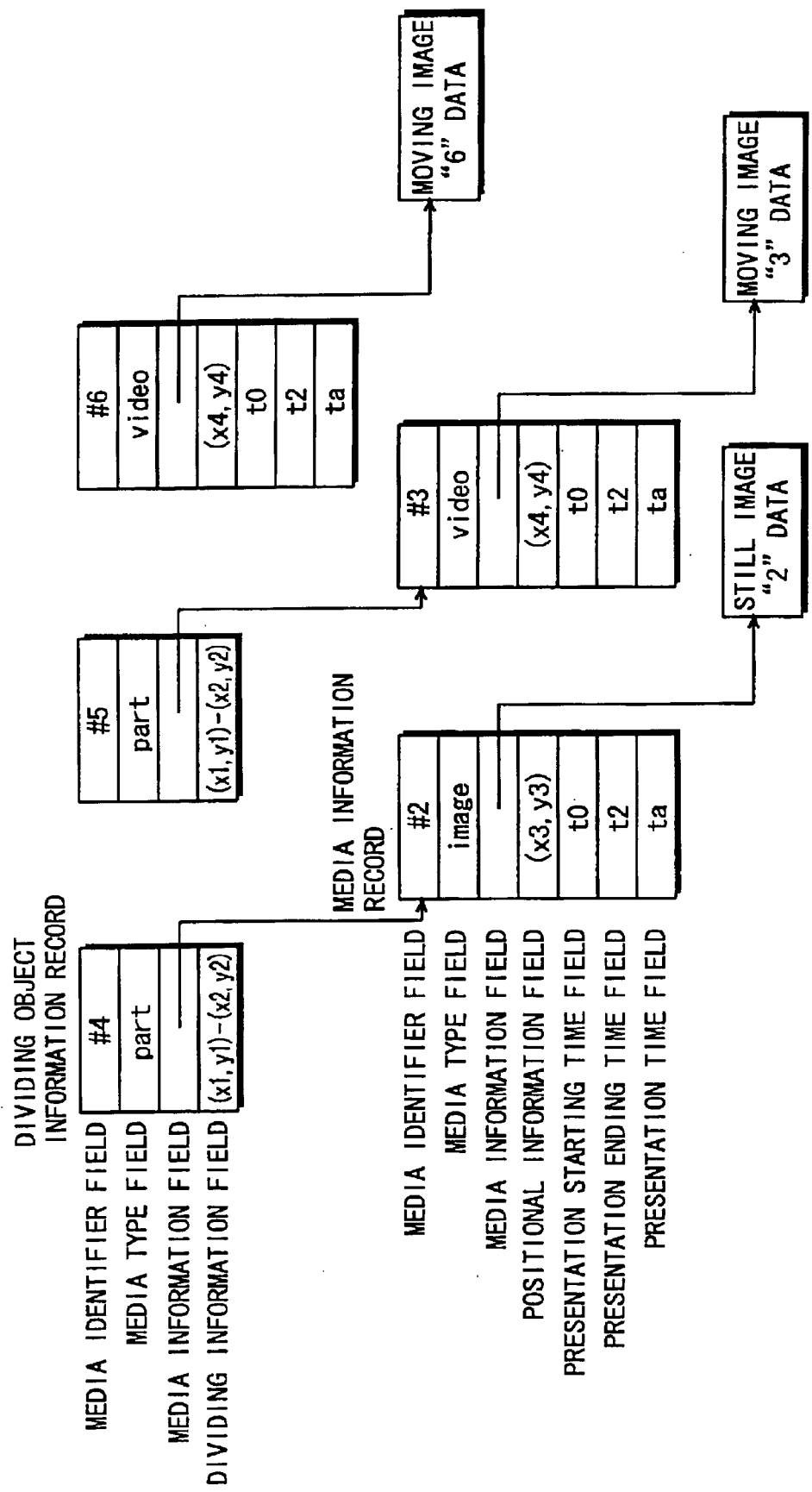
FIG. 20 is a diagram showing dividing object information for composing the return mail in FIG. 19 by editing/processing the incoming mail in FIG. 18.

The computer system then generates dividing object information as shown in FIG. 20, and then generates divided objects from the objects #2 and #3 (received objects) according to the dividing object information.

To be specific, the object #2 in the mail-composing window is divided. Then one of the two objects obtained after the division is deleted, and the other is provided with a new identifier #4.

Moreover, the object #3 is divided immediately after the address &5, and one of the two objects (a part after the address &6) is deleted and the other (a part between addresses &1 and &5) is provided with a new identifier #5. Thereafter, the object #6 is inserted into a position immediately after the object #5.

Herein, processing of dividing and deleting the objects is executed in a similar manner to the second embodiment.

In this manner, the return mail as shown in FIG. 19 can be obtained. This return mail is displayed on the display 201 for the user's confirmation.

Next, the user instructs the computer system to transmit such return mail. In response thereto, the computer system structures the return mail in a predetermined format for a return mail, and then transmits the mail to the computer system on the recipient side.

The user is now through steps S107 and S108.
(Sixth Embodiment)

Figure 21:
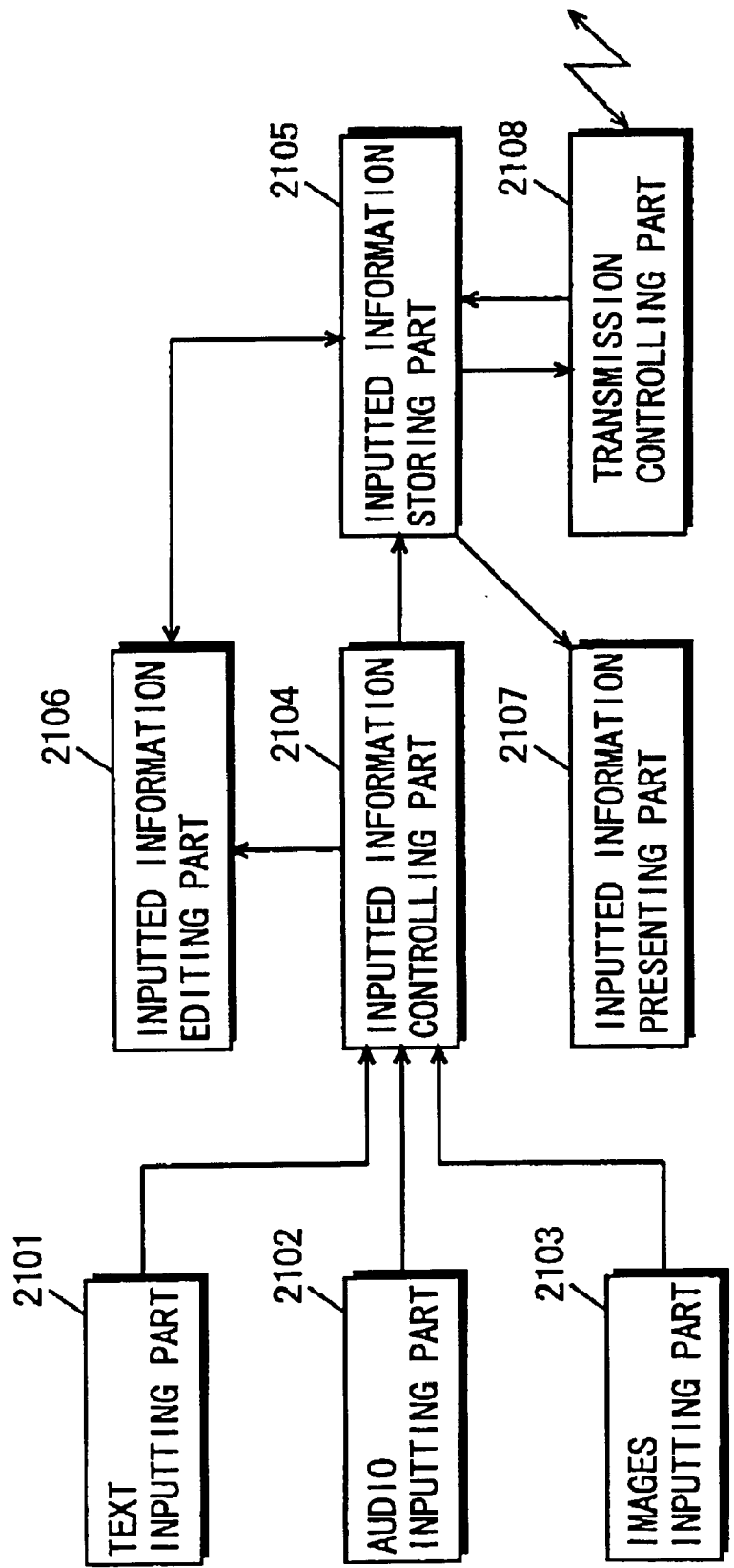
FIG. 21 is a block diagram showing the functional structure of a transmitting terminal provided for a multi-media E-mail system according to a sixth embodiment of the present invention.

FIG. 21 is a block diagram showing the functional structure of a transmitting terminal provided for a multi-media E-mail system according to a sixth embodiment of the present invention.

Figure 22:
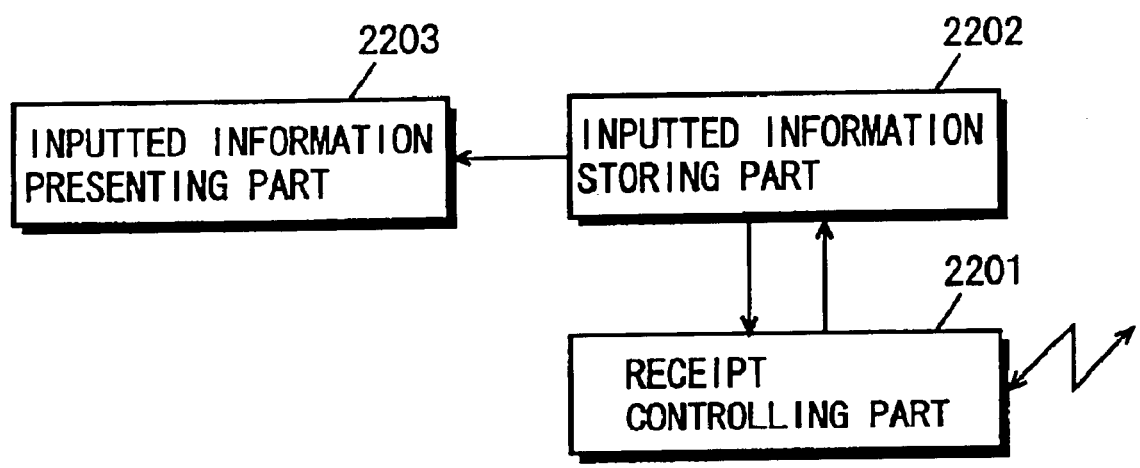
FIG. 22 is a block diagram showing the functional structure of a receiving terminal provided for the multi-media E-mail system according to the sixth embodiment of the present invention.

FIG. 22 is a block diagram showing the functional structure of a receiving terminal provided for the same system.

In FIG. 21, the transmitting terminal provided for the multi-media E-mail according to the sixth embodiment of the present invention includes a text inputting part 2101, an audio inputting part 2102, an images inputting part 2103, an inputted information controlling part 2104, an inputted information storing part 2105, an inputted information editing part 2106, an inputted information presenting part 2107, and a transmission controlling part 2108.

The text inputting part 2101 receives text (text information). The audio inputting part 2102 receives audio information. The images inputting part 2103 receives image information. The inputted information controlling part 2104 controls each of inputted information as an object. The inputted information storing part 2105 stores the inputted information. Specifically, text, audio, and image information to be inputted is provided for the inputted information editing part 2106 by the inputted information storing part 2104, and also is written into the inputted information storing part 2105.

The inputted information editing part 2106 provides each of the inputted information with an identifier (# number), and edits a temporal and/or spatial attribute(s) of the inputted information having the identifiers (that is, deleting any object included in the incoming mail, adding any new object, or changing temporal and/or spatial relationship among the objects). Thereafter, the inputted information editing part 2106 generates control information indicating an editing procedure thereof.

The inputted information presenting part 2107 presents editing results of the inputted information editing part 2106. To be specific, a user refers to the inputted information presenting part 2107 to confirm the editing results of the inputted information editing part 2106.

The transmission controlling part 2108 manages to which computer system a mail is transmitted and transmission historical information. In accordance therewith, the transmission controlling part 2108 sends out a multi-media E-mail to a not-shown network. The multi-media E-mail includes the control information generated by the inputted information editing part 2106 and the objects. Note that, when the multi-media E-mail is a return mail, the received objects are not transmitted.

In FIG. 22, the receiving terminal provided for the multi-media E-mail system according to the sixth embodiment of the present invention includes a receipt controlling part 2201, an inputted information storing part 2202, and an inputted information presenting part 2203.

The receipt controlling part 2201 receives the multi-media E-mail from the network, and then writes inputted information (received objects) included therein into the inputted information storing part 2202.

The receipt controlling part 2201 also manages receipt historical information. By referring thereto, the receipt controlling part 2201 temporally and/or spatially positions the inputted information (objects) included therein and the transmitted objects according to the control information included in the multi-media E-mail so as to restore the mail intended by the sender of the incoming mail.

Such restored mail is then presented to the receiver via the inputted information presenting part 2203.

Herein, note that the transmitting terminal and receiving terminal in the foregoing are usually in a unit. That is, a transmitting/receiving terminal which is an integral type of the transmitting terminal in FIG. 21 and the receiving terminal in FIG. 22 is popular for the multi-media E-mail system.

Such integral-type transmitting/receiving terminal can be realized by the computer system as shown in FIG. 2, for example. With the processing executed in a similar manner to the flowchart in FIG. 1, the sixth embodiment can be effective similarly to the first embodiment.

(Seventh Embodiment)

Figure 23:
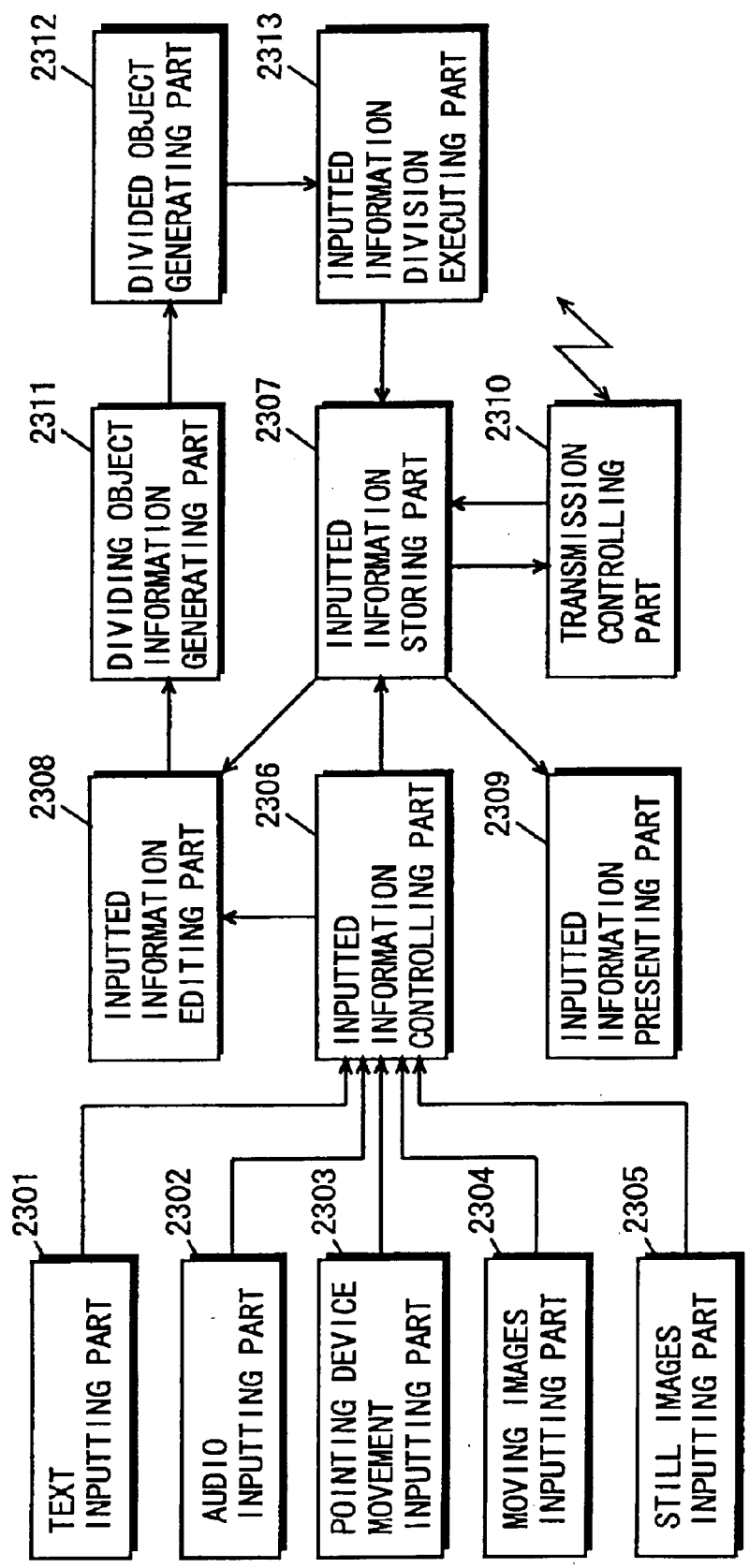
FIG. 23 is a block diagram showing the functional structure of a transmitting terminal provided for a multi-media E-mail system according to a seventh embodiment of the present invention.

FIG. 23 is a block diagram showing the functional structure of a transmitting terminal provided for the multi-media E-mail system according to a seventh embodiment of the present invention.

Figure 24:
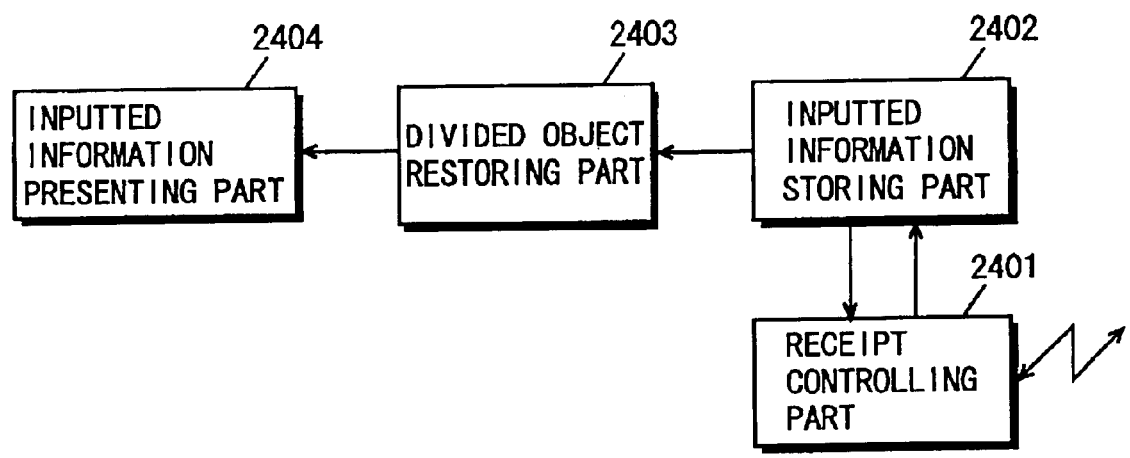
FIG. 24 is a block diagram showing the functional structure of a receiving terminal provided for the multi-media E-mail system according to the seventh embodiment of the present invention.
Figure 25:
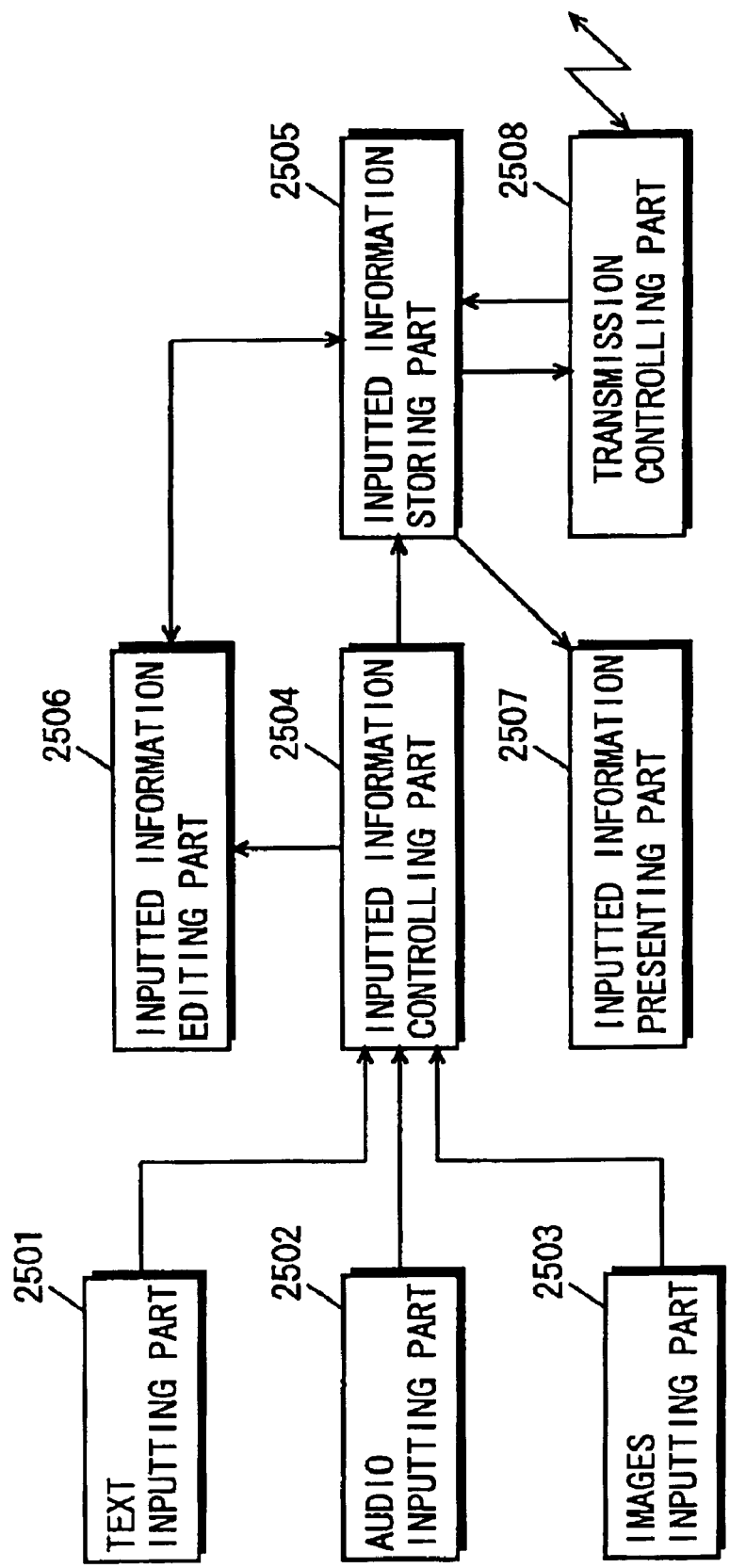
FIG. 25 is a block diagram showing the functional structure of a transmitting terminal provided for a multimedia E-mail system according to a conventional example.
Figure 26:
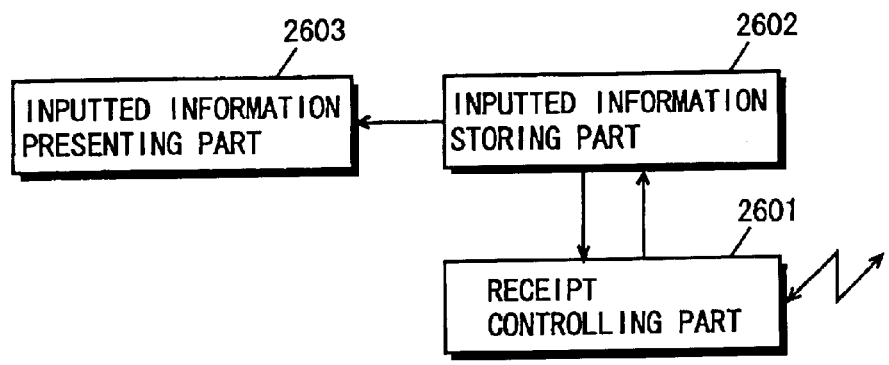
FIG. 26 is a block diagram showing the functional structure of a receiving terminal provided for the multi-media E-mail system according to the conventional example.

FIG. 24 is a block diagram showing the functional structure of a receiving terminal provided for the same system.

In FIG. 23, the transmitting terminal provided for the multi-media E-mail system according to the seventh embodiment of the present invention includes a text inputting part 2301, an audio inputting part 2302, a pointing device 210 movement inputting part 2303, a moving images inputting part 2304, a still images inputting part 2305, an inputted information controlling part 2306, an inputted information storing part 2307, an inputted information editing part 2308, an inputted information presenting part 2309, a transmission controlling part 2310, a dividing object information generating part 2311, a divided object generating part 2312, and an inputted information division executing part 2313.

The text inputting part 2301 receives text (text information). The audio inputting part 2302 receives audio information. The pointing device 210 movement inputting part 2303 receives movements (handwriting information) of the pointing device 210. The moving images inputting part 2304 receives moving image information. The still images inputting part 2305 receives still image information. The inputted information controlling part 2306 controls each of inputted information as an object. The inputted information storing part 2307 stores the inputted information. To be specific, text, audio, pointer trail, still image, and moving image information to be inputted is provided for the inputted information editing part 2308 by the inputted information controlling part 2306, and also is written into the inputted information storing part 2307.

The inputted information editing part 2308 provides each of the inputted information with an identifier (# number), and edits a temporal and/or spatial attribute(s) of the inputted information having the identifiers (that is, deleting any received object included in the incoming mail, adding any new object, or changing temporal and/or spatial relationship among the objects). The inputted information editing part 2308 also provides the identifiers for divided objects generated by the divided object generating part 2312 and edits a temporal and/or spatial attribute(s) thereof. Thereafter, the inputted information editing part 2308 generates control information indicating an editing procedure thereof.

The inputted information presenting part 2309 presents editing results of the inputted information editing part 2308. To be specific, a user refers to the inputted information presenting part 2309 to confirm the editing results of the inputted information editing part 2308.

The dividing object information generating part 2311 generates dividing object information. The divided object generating part 2312 instructs the computer system to generates divided objects according to the dividing object information, and the inputted information division executing part 2313 divides the inputted information (objects) according to the instruction.

The transmission controlling part 2310 manages to which computer system a mail is transmitted and transmission historical information. In accordance therewith, the transmission controlling part 2310 sends out a multi-media E-mail to a not-shown network. The multi-media E-mail includes the control information generated by the inputted information editing part 2308 and the inputted information (objects). Note that, when the multi-media E-mail is a return mail, the received objects and divided objects are not transmitted but the dividing object information generated by the dividing object information generating part 2311.

In FIG. 24, the receiving terminal provided for the multi-media E-mail system according to the seventh embodiment of the present invention includes a receipt controlling part 2401, an inputted information storing part 2402, a divided object restoring part 2403, and an inputted information presenting part 2404.

The receipt controlling part 2401 receives a multi-media E-mail from the network, and writes the inputted information (received objects) included therein into the inputted information storing part 2402.

The divided object restoring part 2403 restores divided objects similar to the ones generated on the sender side of the incoming mail from the transmitted objects according to the division object information included in the multi-media E-mail.

The receipt controlling part 2401 also manages the receipt historical information. By referring thereto, the receipt controlling part 2401 temporally and/or spatially positions the inputted information (objects) according to the control information included in the multi-media E-mail, thereby restoring the mail intended by the sender of the incoming mail.

Such restored mail is presented to the receiver via the inputted information presenting part 2404.

Note that, the transmitting terminal and receiving terminal in the foregoing are usually in a unit. That is, a transmitting/receiving terminal which is an integral type of the transmitting terminal in FIG. 23 and the receiving terminal in FIG. 24 is popular for the multi-media E-mail system.

Such integral-type transmitting/receiving terminal can be realized by the computer system as shown in FIG. 2, for example. With the processing executed in a similar manner to the flowchart in FIG. 1, the sixth embodiment can be effective similarly to the second to fifth embodiments.

While the invention has been described in detail, the foregoing description is in all aspects illustrative and not restrictive. It is understood that numerous other modifications and variations can be devised without departing from the scope of the invention.

What is claimed is:

1. A multi-media E-mail method of transmitting/receiving a multimedia E-mail including information objects comprising at least one of various types of media information and positioning control information indicating how the information objects are temporally and/or spatially positioned, said multi-media E-mail method comprising:

receiving the multi-media E-mail from a sender;

restoring the received multi-media E-mail by positioning each of the information objects included in the received multi-media E-mail according to the positioning control information included therein;

storing the information objects included in the received multi-media E-mail as received media information;

composing a return mail for the restored incoming mail comprising return information objects, of which at least one return information object is an information object included in the received multi-media E-mail, and return positioning control information indicating how all return information objects are temporally and/or spatially positioned by utilizing the received media information; and transmitting the composed return mail back to the sender in a form of a multi-media E-mail including the return information objects except for at least one return information object which is an information object included in the received multi-media E-mail, and further including the return positioning control information for all return information objects.

2. The multi-media E-mail method according to claim 1, wherein when composing the return mail, the received information objects are divided, and the return mail is composed by using the divided objects obtained by the division, and wherein when transmitting the return mail, as an alternative to transmitting the divided information objects, division controlling information indicating at where the received information objects are divided is transmitted in addition to the multi-media E-mail.

3. The multi-media E-mail method according to claim 1, further comprising storing the information objects included in the multi-media E-mail to be transmitted as transmitted information objects, wherein when restoring the incoming mail, the incoming mail is restored by positioning the received information objects and the transmitted information objects according to the positioning control information included in the multi-media E-mail.

4. The multi-media E-mail method according to claim 3, wherein when restoring the incoming mail, the transmitted information objects are divided according to division controlling information included in the received multi-media E-mail, and the incoming mail is restored by using the divided information objects obtained by the division.

5. A multi-media E-mail device for transmitting/receiving a multimedia E-mail including information objects comprising at least one of various types of media information and positioning control information indicating how the information objects are temporally and/or spatially positioned, the multi-media E-mail device comprising:

a receipt controlling part operable to receive the multi-media E-mail from a sender and to subsequently restore the received multi-media E-mail by positioning every information object included in the received multi-media E-mail according to the positioning control information included therein;

a first inputted information storing part storing the information objects included in the multimedia E-mail received by said receipt controlling part as received information objects;

an inputted information editing part operable to compose a return mail comprising return information objects, of which at least one return information object is an information object included in the received multi-media E-mail, and return positioning control information indicating how the return information objects are temporally and/or spatially positioned by utilizing the received information objects; and a transmission controlling part operable to transmit the return mail to the sender in a form of a multi-media E-mail including the return information objects except for at least one return information object which is an information object included in the received multi-media E-mail, and further including the return positioning control information for all return information objects.

6. The multi-media E-mail device according to claim 5, wherein said inputted information editing part is operable to divide said received information objects, and compose the return mail by using divided information objects obtained by the division when a return mail is composed, and wherein said transmission controlling part is operable to transmit, as an alternative to transmitting the divided information objects, division controlling information indicating at where said received media information is divided in addition to the multi-media E-mail.

7. The multi-media E-mail device according to claim 5, further comprising a second inputted information storing part storing the information objects included in the multi-media E-mail to be transmitted by said transmission controlling part as transmitted information objects, wherein said receipt controlling part is operable to restore the incoming mail by positioning the received information objects and the transmitted information objects according to the positioning control information included in the multi-media E-mail.

8. The multi-media E-mail device according to claim 7, wherein said receipt controlling part is operable to divide the transmitted information objects according to division controlling information included in the received multi-media E-mail when a return mail is restored, and restore the incoming mail by using the divided information objects obtained by the division.

9. A recording medium having a computer readable program stored thereon for instructing a computer device operable to transmit/receive a multi-media E-mail including information objects comprising at least one of various types of media information and positioning control information indicating how the information objects are temporally and/or spatially positioned, the program comprises instructions operable to instruct the computer device to:

receive the multi-media E-mail from a sender;

restore the received multi-media E-mail by positioning each of the information objects included in the received multi-media E-mail according to the positioning control information included therein;

store the information objects included in the received multi-media E-mail as received media information;

compose a return mail for restored incoming mail comprising return information objects, of which at least one return information object is an information object included in the received multimedia E-mail, and return positioning control information indicating how the return information objects are temporally and/or spatially positioned by utilizing the received information objects; and transmit the composed return mail to the sender in a form of a multi-media E-mail including the return information objects except for at least one return information object which is an information object included in the received multi-media E-mail, and further including the return positioning control information for all return information objects.

10. The recording medium according to claim 9, wherein the instructions operable to instruct the computer device to compose the return mail comprises instructions operable to instruct the computer device to divide the received information objects, and compose the return mail by using divided information objects obtained by the division, and wherein the instructions operable to instruct the computer to transmit the return mail, as an alternative to said divided information objects, comprise instructions operable to instruct the computer device to transmit division controlling information indicating at where the received information objects are divided in addition to the multi-media E-mail.

11. The recording medium according to claim 9, wherein the instructions operable to instruct the computer device further comprise instructions operable to instruct the computer device to store the information objects included in the multi-media E-mail to be transmitted as transmitted information objects, and wherein the instructions operable to instruct the computer device to restore the incoming mail, by positioning the received information objects and the transmitted information objects according to the positioning control information included in the multi-media E-mail.

12. The recording medium according to claim 11, wherein the instructions operable to instruct the computer device to restore the incoming mail, are further operable to instruct the computer device to divide the transmitted information objects according to division controlling information included in the received multi-media E-mail and restore the incoming mail by using the divided information objects obtained by the division.

* * * * *

UNITED STATES PATENT AND TRADEMARK OFFICE
CERTIFICATE OF CORRECTION

PATENT NO.   : 6,839,736 B1
DATED        : January 4, 2005
INVENTOR(S)  : Satoshi Kajita et al.

It is certified that error appears in the above-identified patent and that said Letters Patent is hereby corrected as shown below:

Column 23,
Line 41, "multimedia" should read -- multi-media --.

Column 24,
Lines 28 and 40, "multimedia" should read -- multi-media --.

Column 25,
Line 39, "multimedia" should read -- multi-media --.

Signed and Sealed this

Seventh Day of June, 2005

JON W. DUDAS
*Director of the United States Patent and Trademark Office*